United States Patent
King et al.

(10) Patent No.: US 9,113,076 B2
(45) Date of Patent: *Aug. 18, 2015

(54) AUTOMATICALLY CAPTURING INFORMATION SUCH AS CAPTURING INFORMATION USING A DOCUMENT-AWARE DEVICE

(71) Applicant: Google Inc., Mountain View, CA (US)

(72) Inventors: Martin T. King, Vashon Island, WA (US); Redwood Stephens, Mountain View, CA (US); Claes-Fredrik Mannby, Mountain View, CA (US); Jesse Peterson, Mercer Island, WA (US); Mark Sanvitale, Mountain View, CA (US); Michael J. Smith, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,181

(22) Filed: Jan. 22, 2014

(65) Prior Publication Data

US 2014/0232889 A1  Aug. 21, 2014

Related U.S. Application Data

(63) Continuation of application No. 12/660,146, filed on Feb. 18, 2010, now Pat. No. 8,638,363.

(60) Provisional application No. 61/184,273, filed on Jun. 4, 2009, provisional application No. 61/159,757, filed on Mar. 12, 2009, provisional application No. 61/153,614, filed on Feb. 18, 2009.

(51) Int. Cl.
| | |
|---|---|
| *H04N 7/18* | (2006.01) |
| *H04N 5/232* | (2006.01) |
| *G06F 17/21* | (2006.01) |
| *G06F 17/24* | (2006.01) |
| *G06F 17/30* | (2006.01) |
| *H04N 1/00* | (2006.01) |
| *G08G 1/017* | (2006.01) |
| *G06K 9/00* | (2006.01) |
| *G06K 9/62* | (2006.01) |

(52) U.S. Cl.
CPC .......... *H04N 5/23222* (2013.01); *G06F 17/211* (2013.01); *G06F 17/241* (2013.01); *G06F 17/243* (2013.01); *G06F 17/30011* (2013.01); *G06F 17/30047* (2013.01); *G06K 9/00442* (2013.01); *H04N 1/0036* (2013.01); *H04N1/00307* (2013.01); *H04N 1/00355* (2013.01); *H04N 1/00374* (2013.01); *H04N 1/00408* (2013.01); *H04N 1/00469* (2013.01); *H04N 5/23203* (2013.01)

(58) Field of Classification Search
CPC ........... H04N 5/23222; G06K 9/00442; G08B 29/20; G08B 13/194
See application file for complete search history.

(56) References Cited

U.S. PATENT DOCUMENTS

| | | | | |
|---|---|---|---|---|
| 6,081,206 | A * | 6/2000 | Kielland | 340/937 |
| 7,412,078 | B2 * | 8/2008 | Kim | 382/105 |
| 2008/0020795 | A1 | 1/2008 | Kim | |
| 2010/0265331 | A1* | 10/2010 | Tanaka | 348/159 |

FOREIGN PATENT DOCUMENTS

| | | |
|---|---|---|
| CN | 101110906 | 1/2008 |
| CN | 101178725 | 5/2008 |

OTHER PUBLICATIONS

Chinese Office Action in Chinese Application No. 201080008009.7, dated Apr. 18, 2014, 20 pages (with English translation).

* cited by examiner

*Primary Examiner* — Wen-Tai Lin

(74) *Attorney, Agent, or Firm* — Fish & Richardson P.C.

(57) ABSTRACT

A system and method for automatically changing the operation of a mobile device in response to a presence of information is described. In some examples, the system determines an information capture device is proximate to text, automatically changes operation of the capture device to a certain mode, captures the text, and performs an action associated with the captured text.

13 Claims, 11 Drawing Sheets

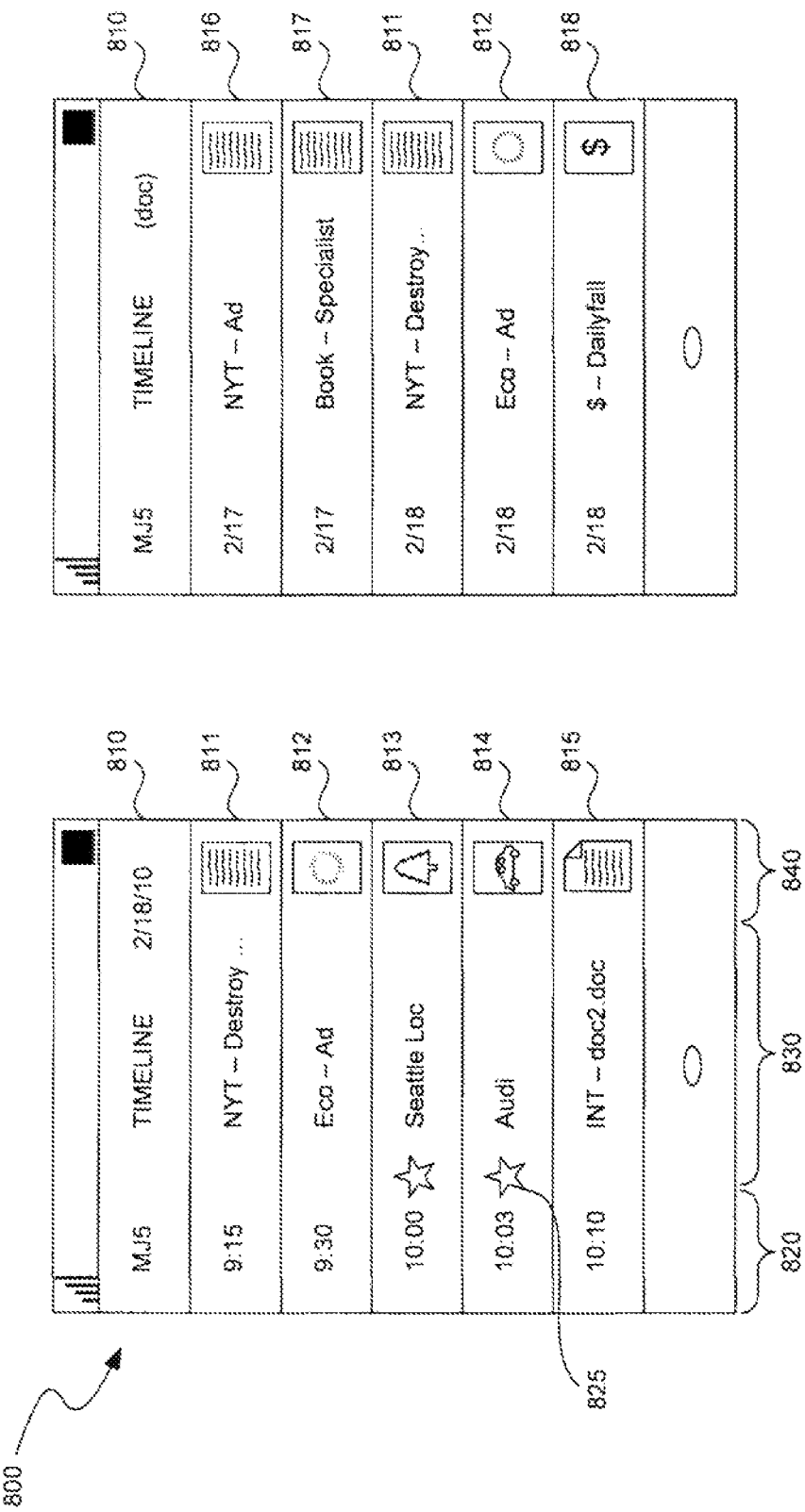

AUTOMATICALLY CAPTURING INFORMATION SUCH AS CAPTURING INFORMATION USING A DOCUMENT-AWARE DEVICE

CROSS REFERENCE TO RELATED APPLICATIONS

This application is a continuation of U.S. patent application Ser. No. 12/660,146, filed on Feb. 18, 2010, entitled AUTOMATICALLY CAPTURING INFORMATION SUCH AS CAPTURING INFORMATION USING A DOCUMENT-AWARE DEVICE, which claims priority to U.S. Provisional Patent Application No. 61/184,273, filed on Jun. 4, 2009, entitled DOCUMENT INTERACTION SYSTEM AND METHOD, U.S. Provisional Patent Application No. 61/159,757, filed on Mar. 12, 2009, entitled DOCUMENT INTERACTION SYSTEM AND METHOD, and U.S. Provisional Patent Application No. 61/153,614, filed on Feb. 18, 2009, entitled DOCUMENT INTERACTION, SUCH AS INTERACTION USING A MOBILE DEVICE, all of which are hereby incorporated by reference in their entirety.

This application is related to PCT Application No. PCT/EP/2007/008075, filed on Sep. 17, 2007, entitled CAPTURE AND DISPLAY OF ANNOTATIONS IN PAPER AND ELECTRONIC DOCUMENTS; U.S. patent application Ser. No. 12/660,151, filed on Feb. 18, 2010, entitled INTERACTING WITH RENDERED DOCUMENTS USING A MULTI-FUNCTION MOBILE DEVICE, SUCH AS A MOBILE PHONE; and U.S. patent application Ser. No. 12/660,154, filed on Feb. 18, 2010 and issued as U.S. Pat. No. 8,418,055, entitled IDENTIFYING DOCUMENTS BY PERFORMING SPECTRAL ANALYSIS ON THE DOCUMENTS, all of which are hereby incorporated by reference in their entirety.

BACKGROUND

People constantly receive information that may be of interest to them. Information is presented in many forms, from paper documents (newspapers, books, magazines, and so on) to other objects within the world around them (signs, billboards, displays, and so on). Often, information is at least partially presented via text, either printed on a document or displayed by an object.

BRIEF DESCRIPTION OF THE DRAWINGS

FIGS. 8A-8B are representative displays of capture devices that depict a timeline created by the system for a user.

DESCRIPTION

Overview

Figure 1A:
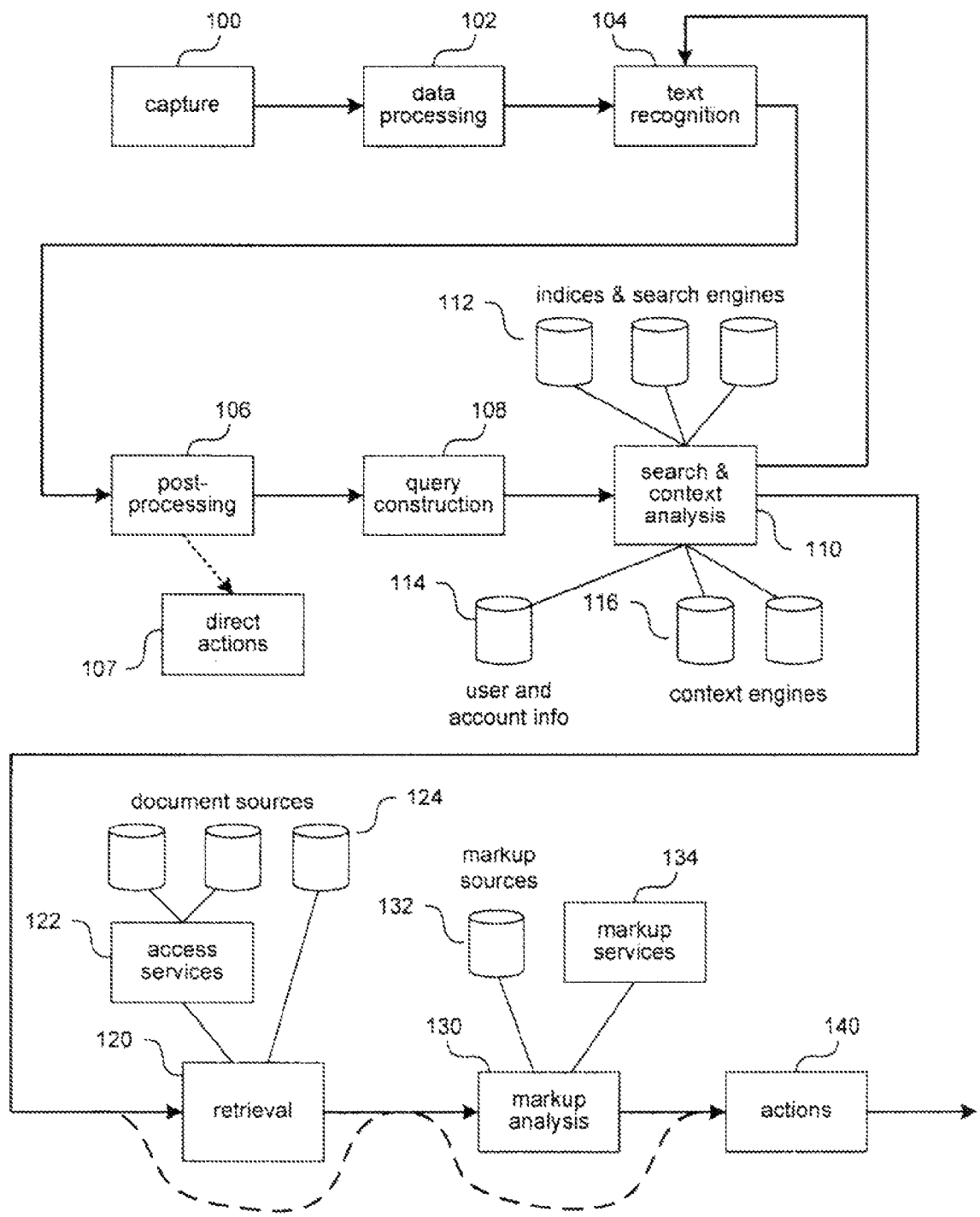
FIG. 1A is a data flow diagram illustrating the flow of information in some embodiments of the system.

Currently, there are few solutions that enable people to access or exploit the information that they receive from the world around them. The inventors have recognized that it would be advantageous to provide technology that makes information more accessible without being burdensome to the people using the technology.

Determining a capture device is proximate to information, such as a rendered document, and changing the operation of the capture device based on the determination, is described. In some examples, the capture device includes a camera that captures images of rendered documents or other displays of information, and a proximity component that detects a proximity to rendered documents or the other displays of information. The proximity component may be or utilize an optical component within the camera, or may be a stand alone component, such as a proximity sensor. The system, upon determining the capture device is proximate to information, may cause the capture device to change to a document capture mode in which the capture device is aware of and interacts with text, documents, and/or other displays of information, such as objects that display text. For example, in the document capture mode, the system, via the capture device, may initiate one or more processes that capture images of rendered documents or displays of information and perform actions based on such captures.

Example Scenarios

The following scenarios present possible applications of the disclosed technology. One of ordinary skill in the art will appreciate these scenarios are provided to teach how the disclosed technology may be implemented, and that the disclosed technology is applicable to other scenarios not explicitly described herein.

A student is reading a textbook, and wishes to find more information about the subject matter. The student places her mobile device over a text passage in the book, with the camera of the device facing the book. The system uses a rangefinder and determines the mobile device is in proximity to the book, causing the mobile device to change operational mode to a text capture mode. The system captures a text snippet from the book, identifies the location in the book where the capture occurred, and presents author commentary associated with the passage on a display of the mobile device.

Before going to a meeting at a partner's office, a woman takes out the business card of the partner and hovers her phone over the card. The system uses a position sensor and determines the phone is orientated in a way that is indicative of an intention to capture text, causing the phone to change operational mode to a text capture mode. The system captures the address from the business card and launches a mapping application that displays directions from the woman's location to the partner's office.

A man walking down the street wearing a capture device integrated into his glasses sees that his dream home is for sale. He turns his head to look at a For Sale sign in front of the house. The system, upon detecting text within the view of the capture device, changes operation of the device to an information capture mode and takes an image of the For Sale sign and the house. The system stores the information in a timeline associated with the man. Later, at home, the man accesses his timeline, selects the entry associated with the house, and retrieves additional information about the house. He ends up placing a bid on the house that is accepted, and moves into his dream home shortly thereafter.

Of course, other scenarios, such as those related to the methods and techniques described herein, are possible.

Various embodiments of the system will now be described. The following description provides specific details for a thorough understanding and enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Part I—Introduction

1. The System and its Users

People visually consume information from rendered (printed and displayed) media, including information presented in text, images, video, and other forms. For example, people read newspapers, magazines, books, blogs, text messages, billboards, receipts, notes, and so on; look at photographs, paintings, objects, advertisements, and so on; and watch movies, videos, performances, other people, and so on. In fact, people receive and consume information all the time simply by observing the world around them.

Such observation, or consumption of information, may be active (the user is aware and often engaging with information) or inactive (the user is unaware but still receiving information). A person may obtain information intentionally by, for example, people often "pulling" it, or unintentionally by when it is "pushed" to them (inactive consumption). In a sense, people mimic devices (computers, mobile phones, and other devices), which pull information and receive pushed information in how they interact with the world.

Devices, however, are not people, and current devices often do a poor job of capturing information within a surrounding environment or proximate to the device. The technology disclosed herein describes systems and methods that enable and facilitate awareness in devices. The technology may facilitate an awareness of text-based information proximate to a device, an awareness of image-based information proximate to a device, an awareness of a display of information proximate to a device (such as a rendered document), and so on. Using the disclosed technology, devices can mimic people in how they interact with the world.

1.1. Physical/Digital Interactions

Virtually every physical display of information is or can be associated with additional digital information. For example, an image can be associated with a description (e.g., metadata), a web page, and so on; a single word can be associated with a definition, a Wikipedia entry, an advertisement, and so on; a document can be associated with its electronic counterpart, a web page, a slide show, and so on; a geographical location (or object at the location) can be associated with metadata, images, information about the location; a audio stream can be associated with a slide show; and so on. The system, in the presence of a physical display of information, need only identify the display of information (or partial aspects of the display of information, such as text in the display of information) to gain access to associated information. The system enables the physical display of information to act as platform from which a rich, digital, third dimension of interactivity, encompassing users and content, is created.

1.2. Identification of a Rendered Document

In some cases, identifying a rendered document may provide a reader with access to a wealth of additional information that complements the document itself and enriches the reader's experience. For every rendered document that has an electronic counterpart, portions of the information in the rendered document can be used to identify the electronic counterpart. In some examples, the system captures and uses a sample of text from a rendered document to identify and locate an electronic counterpart of the document. In some cases, the sample of text needed by the system is very small, in that a few words or partial words of text from a document can often function as an identifier for the rendered document and as a link to its electronic counterpart. In addition, the system may use those few words to identify not only the document, but also a location within the document. Thus, rendered documents and their digital counterparts can be associated in many useful ways using the system discussed herein.

Thus, rendered documents and their electronic counterparts can be associated in many useful ways using the system discussed herein.

Simply, when a user scans a few words, characters, or regions in a rendered document, the system can retrieve the electronic counterpart document or some part of it, display the electronic counterpart or some part of it, email it to somebody, purchase it, print it, post it to a web page, or perform other actions that enable a user to interact with the document or related content. For example, a user hovers his/her mobile device (and its camera) over a portion of a newspaper or magazine article, causing the user's mobile device to display an electronic version of the article on the touch screen of the mobile device as well as provide options to the user that allow the user to further interact with the article. In some cases, the hovering over the article may cause the mobile device to switch to a document aware or interaction mode, such as when the mobile, device detects a certain proximity to the article.

The system implements these and many other examples of "paper/digital integration" without requiring changes to the current processes of writing, printing and publishing documents and other displays of information, giving rendered documents and physical objects a whole new layer of digital functionality.

Once the system has associated a piece of text in a rendered document with a particular digital entity has been established, the system is able to build a huge amount of functionality on that association.

It is increasingly the case that most rendered documents have an electronic counterpart that is accessible on the World Wide Web or from some other online database or document corpus, or can be made accessible, such as in response to the payment of a fee or subscription. At the simplest level, then, when a user captures a few words in a rendered document, the system can retrieve that electronic document or some part of it, display it, email it to somebody, purchase it, print it, and/or post it to a web page. As additional examples, capturing a few words of a book that a person is reading over breakfast could cause the audio-book version in the person's car to begin reading from that point when s/he starts driving to work, or capturing the serial number on a printer cartridge could begin the process of ordering a replacement.

A typical use of the system begins with using a capture device to capture text from a rendered document, but it is important to note that other methods of capture from other types of objects are equally applicable. The system is therefore sometimes described as capturing or scanning text from a rendered document, where those terms are defined as follows:

A rendered document is a printed document or a document shown on a display or monitor. It is a document that is perceptible to a human, whether in permanent form or on a transitory display. It is a physical object that provides information via a presentation layer. Rendered documents include paper documents, billboards, signs, information provided by a presentation layer of a computing device, information propagated by a wave, such as an audio or video stream of information, and/or other physical objects that present or display information.

Capturing or scanning is the process of systematic examination to obtain information from a rendered document. The process may involve optical capture using, for example, a camera in a cell phone or a handheld optical scanner, or it may involve reading aloud from the document into an audio capture device or typing it on a keypad or keyboard. For more examples, see Section 15.

In addition to capturing text from rendered documents, the system may capture information from other sources, such as radio frequency identification (RFID) tags, QR codes, bar codes, other physical objects (e.g., paintings, sculpture), information directly from the presentation layer of a computing device, and so on. Other sources may include audio and/or video-based documents, such as radio programs and other content on radio channels; video and other content on video channels, including TV shows, TV commercials, movies, and so on, whether rendered from a local medium, such as a video disk, or streamed from a remote server, and so on. As an example, the system may capture information from an audio source and display information or supplemental content associated with the audio source or the contents of the audio stream produced by the source.

2. Introduction to the System

This section describes some of the devices, processes and systems that constitute a system for paper/digital integration. In various examples, the system builds a wide variety of services and applications on this underlying core that provides the basic functionality.

2.1. The Processes

FIG. 1A is a data flow diagram that illustrates the flow of information in some examples of a suitable system. Other examples may not use all of the stages or elements illustrated here, while some will use many more.

A capture device, such as a mobile device having a camera and/or voice recorder, captures 100 text and/or other information from a rendered document or from information displayed in proximity to the device. The device may process 102 the captured data, for example to remove artifacts of the capture process, to improve the signal-to-noise ratio, to identify or locate desired information within the data, and so on. The system, via a recognition component (such as an OCR device, speech recognition device, autocorrelation device, or other techniques described herein) then optionally converts 104 the data into one or more signatures, such as segments of text, text offsets, or other symbols or characters. Alternatively, the system performs an alternate form of extracting one or more document signatures from the rendered document. In some cases, the signature represents a set of possible text transcriptions. In some cases, the process may be influenced or constrained by feedback from other previously or subsequently performed steps. For example, where the system has previously identified candidate documents from which the capture likely originates, it is able to narrow the possible interpretations of the original capture.

Post-processing components may receive data from the recognition process and filter 106 the data, or perform other operations, as desired. In some examples, the system may deduce, determine, identify, and/or perform direct actions 107 immediately and without proceeding to the following steps in the routine, such as when the system captures a phrase or symbol that contains sufficient information to infer the user's intent. In these cases, the system may not need to identify or reference a digital counterpart document in order to carry out the user's wishes.

The system, in step 108, may then construct a query or a set of queries for use in searching for an electronic counterpart or other content associated with the capture. Some aspects of the query construction may depend on the search process used, and the system may perform them in a later step (such as after a search is performed), but there will typically be some operations, such as the removal of obviously misrecognized or irrelevant characters, the system can perform in advance.

The system passes 110 the query or queries to a search and context analysis component. The system may attempt to identify the document from which the original data was captured. To do so, the system may use search indices and search engines 112, knowledge about the user 114, and/or knowledge about the user's context or the context in which the capture occurred 116. For example, the system may interact with a search engine 112 that employs and/or indexes information specifically about rendered documents, about their digital counterpart documents, and/or about documents that have a web (internet) presence. The system may transfer information back and forth with these information sources, and may feed identified information into various other steps of the routine. For example, the system may receive information about the language, font, rendering, and likely next words of a capture based on receiving knowledge of candidate documents during step 110.

The system, in step 120, may retrieve a copy of the document or documents identified earlier as being electronic counterparts to the rendered document. The system may have direct access to document sources and repositories 124 (e.g., a local filing system or database or a web server), or the system may contact an access service 122 to retrieve a document or documents. The access service 122 may enforce authentication, security or payments for documents, or may provide other services, such as conversion of the document into a desired format or language, among other things.

Applications of the system may take advantage of the association of extra functionality or data with part or all of a document. For example, advertising applications may associate particular advertising messages or subjects with portions of a document, such as keywords, phrases, or proximities to certain content. This extra associated functionality or data that specifies that it should be available in connection with particular portions of the document may be thought of as one or more overlays on the document, and is referred to herein as markup. Thus, in step 130, the system identifies any markup relevant to the captured data and/or an identified electronic counterpart. In some cases, the markup is provided by the user, the originator, the publisher of the document, other users of the document, and so on, and may be stored at a directly accessible source 132, or dynamically generated by a markup service 134. In some examples, the markup can be associated with, and apply to, a rendered document and/or the digital counterpart to a rendered document, or to groups of either or both of these documents.

As a result of some or all of the previous steps, the system may take or perform 140 actions. The actions may be system default actions, such as simply recording the information found, may be dependent on the data or document, or may be derived from the markup analysis. In some cases, the system may simply pass data to another system. In some cases, the possible actions appropriate to a capture at a specific point in a rendered document will be presented to the user as a menu on an associated display, such as a capture device's display (the touch screen of a mobile device) or an associated display (the user's laptop screen). The system may identify or perform an action or actions in response to the capture, in response to a user request to perform an action or actions, or a later time.

As an example of how the capture device may be used, a reader may capture text from a newspaper article with a camera associated with her mobile device. The text is captured as a bit-mapped image via the camera. The logic stores the bit-mapped image in memory and time stamps the image, as well as records other data associated with the capture (such as position of a device, geo-locational data, and so on). The logic also performs optical character recognition (OCR), and converts the image to text. The system uploads the text to an index of content associated with the newspaper, and identifies and retrieves an electronic counterpart for the article. The capture device then displays the electronic counterpart via an associated touch screen along with one or more actions to perform, such as downloading and viewing related articles or articles providing additional background information, highlighting terms within an article and providing links to definitions of those terms, or viewing advertisements or purchasing information for items discussed in or around the article.

Further details regarding system processes, components, and/or devices may be found in the applications incorporated by reference herein.

Figure 1B:
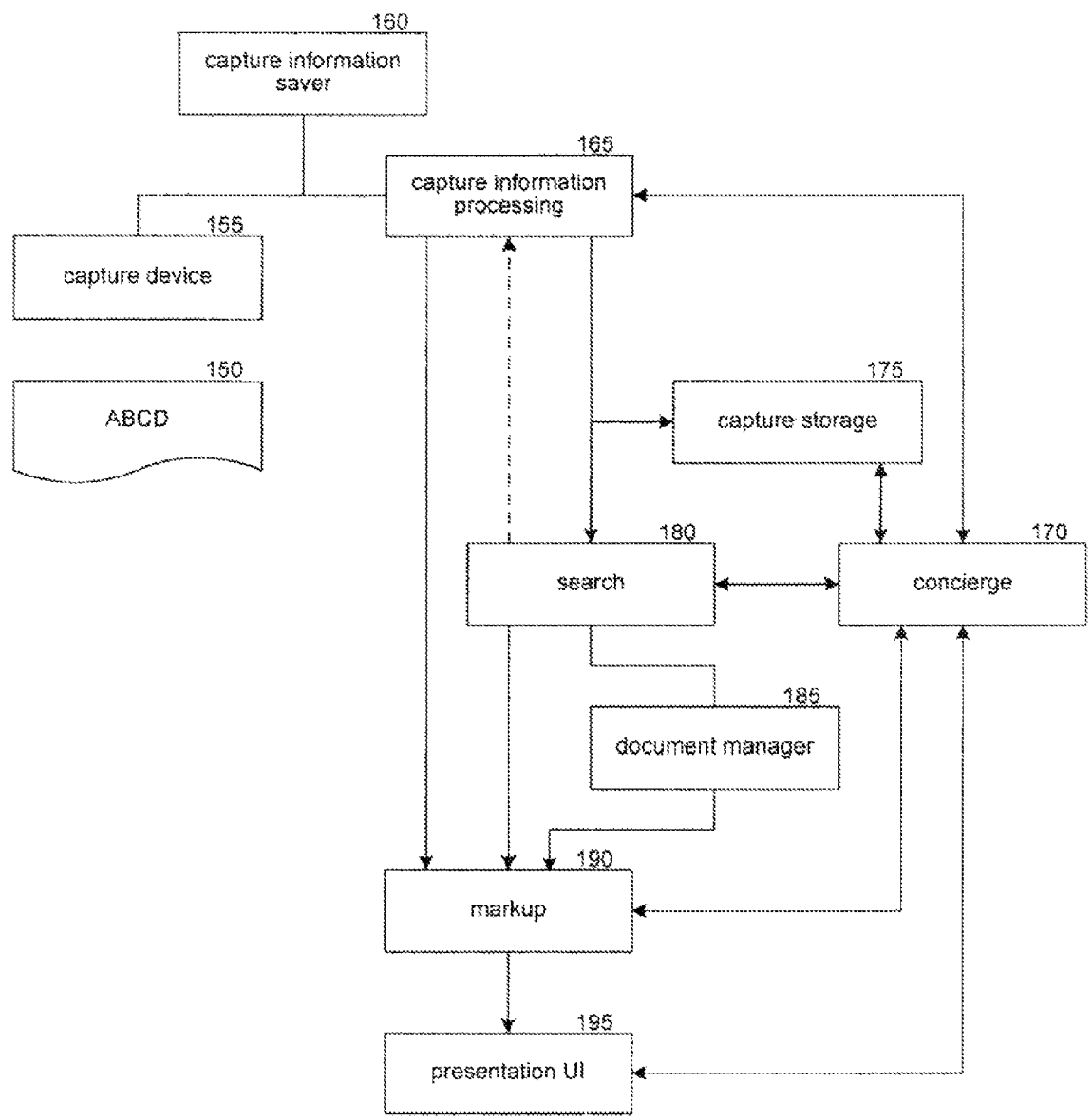
FIG. 1B is a data flow diagram illustrating the flow of information in some embodiments of the system.

FIG. 1B is a data flow diagram that illustrates the flow of information in one example of a suitable system. A capture device 155 captures presented information such as text, audio, video, GPS coordinates, user gestures, barcodes, and so on, from information source 150 and other sources, such as sources in wireless communication with the device (not shown). At step 160, the Information Saver component collects and stores information captured by capture device 155. At step 165, the system passes the information collected from the capture device to a capture information-processing component. The capture information processing component 165 is configured to detect the presence of rendered documents, extract text regions from documents, and analyze the document information to recognize document and text features, such as absolute and relative layout information, paragraph, line and word shadows or profiles, glyph-related features, and character encodings. In some examples, the capture information processing component may be configured to process types of data other than text, such as audio, compass data, GPS, acceleration, history, temperature, humidity, body heat, etc. In some examples, the capture information processing unit will accumulate information over time and composite the accumulated information, for example, to form larger and/or higher resolution images of the information source as the capture device captures or sends more information. In some examples, the Capture Information Processing component may leverage the context (see sections 13 and 14), such as previous information captured by a user, to guide the capture information processing, e.g. by limiting or expanding the amount of processing performed and guiding the assumptions about what is being processed. For example, if the system has recently identified that the user has captured information from a particular source, less processing may be needed subsequently in order to attain a similar level of certainly about the newly captured information, because a search within a limited space of possibilities can quickly result in a match, which can then be further confirmed if desired. The Capture Information Processing component may verify the identified information, such as by automatically confirming or rejecting predictions in the information based on tentative conclusions, or by leveraging a Concierge Service 170 (See Section 19.8), or by requesting user feedback. In step 175, the system stores the captured and processed information as part of the system history and context.

At step 180, the system performs a search based on the processed information and context (see sections 4.2.2, 13 and 14). In some examples, search results may be accumulated and correlated over time, e.g. intersecting search results based on subsets of the information captured over time to resolve ambiguities (such as multiple portions of recorded audio, audio from multiple frequency bands, multiple images, etc.). In some examples, the search results can be further verified by the Capture Information Processing component, e.g. based on the principle that the Image Processing component may perform additional analysis on the search results (or document information retrieved by the Document Manager component 185) and the captured information. For example, if the search component generated 10 possible results, the Capture Information Processing component may determine that 6 of those are very unlikely to match the search results, such as the pattern of vertical strokes in the text. At step 185, if a document was identified, a Document Manager component of the system may retrieve a representation of the document. At step 190, a Markup component of the system may compute and/or retrieve dynamic and/or static markup related to the text output from the capture information-processing step and/or the identified document or the retrieved representation of the document. For more information on static and dynamic markup, see section 5. In some examples, the Markup component produces markup based on identified text, as soon as it is recognized, in parallel with document identification.

At step 195, information may be presented to the user. In some examples, this information may include: feedback, such as a suggestion to move the capture device for better focus; overlaying highlights on the captured images to indicate possible regions of interest, possibly including the region of interest that would be implicitly selected if the user hovers the capture device over the same region; a clean, freshly rendered version of the imaged text, matching the image scale, layout, modeling the capture device's current field of view, etc.; a list of available actions based on the current regions of interest; the results of taking a single action based on the current regions of interest, such as automatically dialing a phone number; presented audio-visual materials using a template appropriate for the type or types of information indicated by the user as being their regions of interest; presenting an informational display and/or audio based on the regions of interest. In some examples, regions of interest can be made up of one region implicitly or explicitly indicated by the user, and successively larger regions, such as phrases, clauses, lines, paragraphs, columns, articles, pages, issues, publications, etc. surrounding the central region of interest. In some examples, a main region of interest is suggested by the system based on location in the image, such as the center of a screen of a capture device, and may be selected through explicit user interaction, or by hovering close to the same region for a short period of time—or by user interaction with a screen, such as by swiping a finger across the region of interest, or tapping somewhere within a suggested region of interest.

2.2. The Components

As discussed herein, a suitable system or operating environment includes a number of different components. For example, the system may include one or more optical capture devices or voice capture devices (such as mobile phones and other multi-function mobile computing devices, hand-held scanning devices, and so on). The capture devices communicate with other components of the system, such as a computer or other mobile devices, using either wired or wireless connections or over a network.

The capture devices, computers and other components on the network may include memory containing computer executable instructions for processing received data or information captured from rendered documents and other sources (such as information displayed on a screen or monitor).

Figure 2:
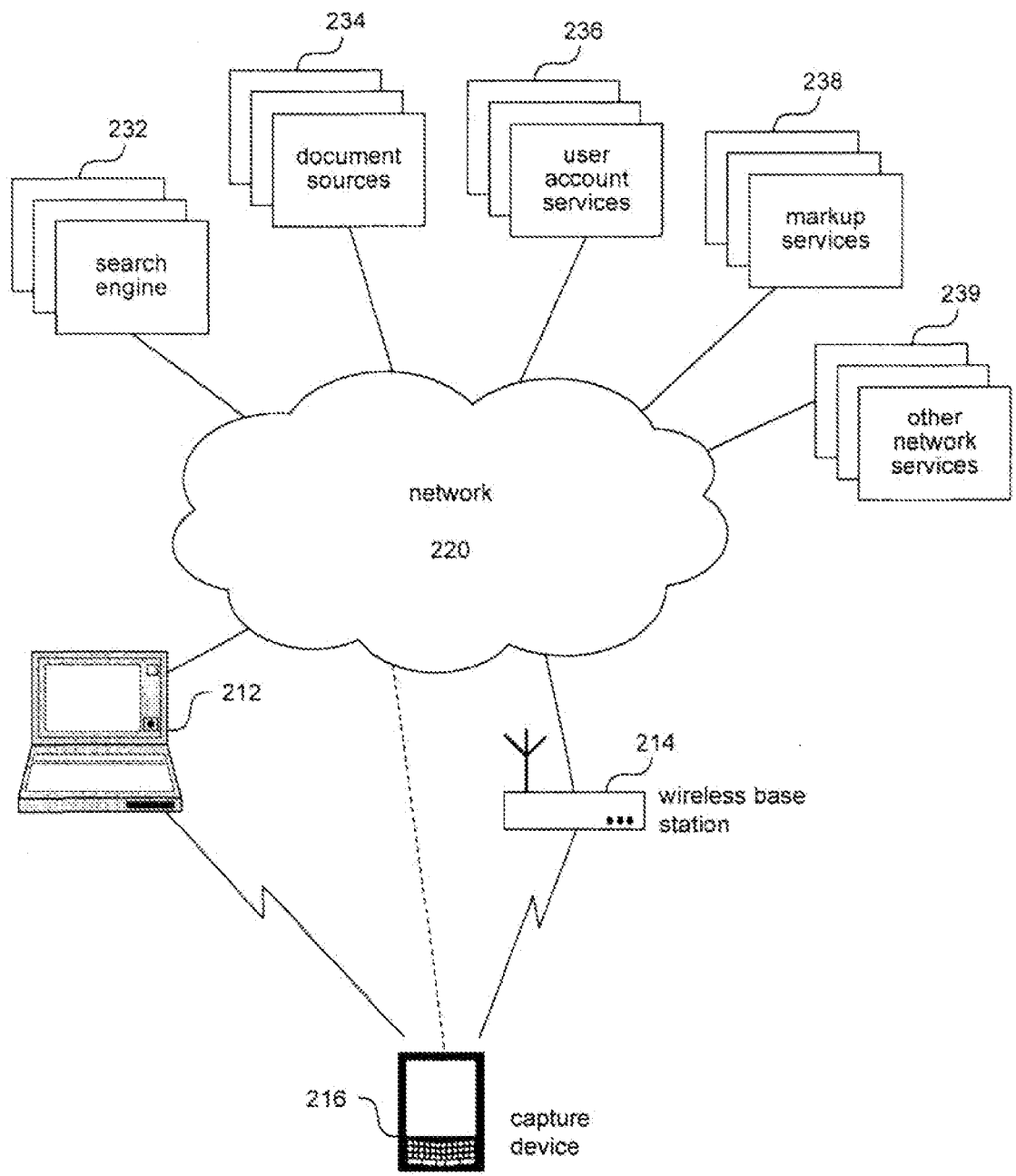
FIG. 2 is a component diagram of components included in a typical implementation of the system in the context of a typical operating environment.

FIG. 2 is a component diagram of components included in a typical implementation of the system in the context of a typical operating environment. As illustrated, the operating environment includes one or more capture devices 216. In some examples, a capture device supports either optical capture or copy with "audio." Each capture device is able to communicate with other parts of the system such as a computer 212 using either a direct wired or wireless connection, or through the network 220, with which it can communicate using a wired or wireless connection, the latter typically involving a wireless base station 214. In some examples, the capture device communications with other components of the system via a cellular telecommunications network (e.g., GSM or CDMA). In some examples, the capture device is integrated, into a mobile device, and optionally shares some of the audio and/or optical components used in the device for voice communications and picture taking.

Computer 212 may include a memory containing computer executable instructions for processing an order from capture device 216. As an example, an order can include an identifier (such as a serial number of the capture device 216 or an identifier that partially or uniquely identifies the user of the capture device), capture context information (e.g., time of capture, location of capture, etc.) and/or captured information (such as a text string) that is used to uniquely identify the source from which data is being captured. In alternative examples, the operating environment may include more or less components.

Also available on the network 220 are search engines 232, document sources 234, user account services 236, markup services 238 and other network services 239. The network 220 may be a corporate intranet, the public Internet, a mobile phone network or some other network, or any interconnection of the above. Regardless of the manner by which the devices and components are coupled to each other, they may all may be operable in accordance with well-known commercial transaction and communication protocols (e.g., Transmission Control Protocol (TCP), Internet Protocol (IP)). In some examples, many of the functions and capabilities of the system may be incorporated or integrated into the capture device.

In various examples, the functions and capabilities of capture device 216 and computer 212 may be wholly or partially integrated into one device. Thus, the terms capture device and computer, can refer to the same device depending upon whether the device incorporates functions or capabilities of the capture device 216 and computer 212. In addition, some or all of the functions of the search engines 232, document sources 234, user account services 236, markup services 238 and other network services 239 may be implemented on any of the devices and/or other devices not shown.

2.3. The Capture Device

The capture device may capture text using an optical or imaging component that captures image data from an object, display of information, and/or a rendered document, or using an audio recording device that captures a user's spoken reading of displayed text, or other methods. In some examples, the capture device may also capture images, movies, graphical symbols and icons, and so on, including machine-readable codes such as barcodes, QR codes, RFID tags, etc., although these are not generally required to recognize a document or perform actions associated with the document or captured text. In some cases, the capture device may also capture images of the environment of the device, including images of objects surrounding the device. The device may be exceedingly simple, and include little more than a transducer, some storage, and a data interface, relying on other functionality residing elsewhere in the system, or it may be a more full-featured device, such as a smartphone. In some cases, the device may be a mobile device with image and audio capture and playback capabilities storing within memory and running or executing one or more applications that perform some or all of the functionality described herein.

The capture device includes a capture element that captures text, symbols, graphics, and so on, from rendered documents and other displays of information. The capture element may include an imaging component, such as an optical scanning head, a camera, optical sensors, and so on.

In some examples, the capture device is a portable scanner used to scan text, graphics, or symbols from rendered documents. The portable scanner includes a scanning element that captures text, symbols, graphics, and so on, from rendered documents. In addition to documents that have been printed on paper, in some examples, rendered documents include documents that have been displayed on a screen such as a CRT monitor or LCD display.

Figure 3:
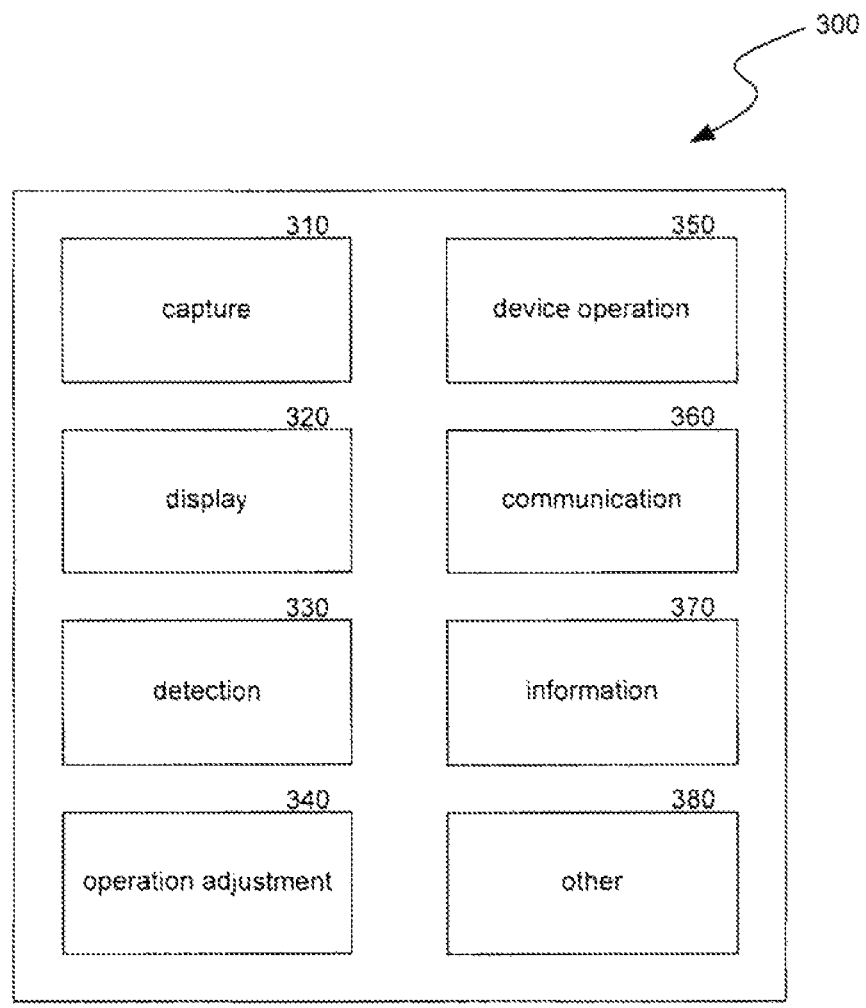
FIG. 3 is a block diagram illustrating a suitable capture device for use with the system.

FIG. 3 a block diagram illustrating an example of a capture device 300. The capture device 300, which may be a mobile phone and/or other mobile or portable device or set of communication devices, including a laptop, a tablet or net book, articles worn by a human (glasses, clothing, hats, accessories, and so on), may include a capture component 310, such as a camera, imaging component, scanning head, microphone or other audio recorder, and so on. In cases when the capture device 300 is a mobile phone, the capture component 310 may be the camera associated with the phone, such as a CMOS image based sensor used in many commercially available phones. In cases where the capture device 300 is a digital camera, the capture component 310 may include the mirror system, prism, lens, and/or viewfinder of the camera. In other cases, the capture component may be a separate component or additional components that are not integrated with the camera of the phone (not shown), including, in some cases, non-optical components.

The capture device 300 may also include a display component 320, such as a user interface, touch screen and/or other capable of displaying information to a user of the device 300. The displayed information may include images captured by the capture component 310, images within view of the capture component 310, content associated with captured information (such as electronic counterparts of captured documents or content that supplements the captured information), content that highlights or overlays markings and other information to content in view of the capture component 310, options menus that indicate actions to be performed in response to captured from captured information, and so on.

The display component 320 may also receive information from a user, such as via user-selectable options presented by the display.

In some examples of the system, the capture device 300 includes one or more components capable of transforming operation of the capture device 300 and/or other computing devices and systems. The capture device 300 may also include a detection component 330 that detects when the device is proximate to information that can be captured by the device 300. The detection component 330 may be part of or integrated with the capture component 310 (such as a component that identifies text within images captured by an imaging component), may be a proximity sensor that measures distances between the capture device 300 and objects (documents, billboards, etc.) around the device, may be an orientation sensor that measures the orientation (angle of inclination with respect to the x, y, or z axes, and so on), of the capture device 300, and so on. Further details regarding interactions between the capture component 310, display component, and/or detection component 330, including routines performed by these components, are described herein.

The detection component 330 may also include or receive information from a timing component (not shown) that measures the duration of certain states of the capture device. For example, the timing component, which may be part of the detection component 330, may measure how long the capture device 300 is held parallel to an axis defined by a rendered document placed on a table, or may measure how long the capture device 300 is within a certain proximity to a street sign), and so on.

The capture device 300 may also include an operation adjustment component 340 that changes the operation or mode of the capture device 300. In some examples of the system, the operation adjustment component 340 (automatically) changes the operational mode of the capture device 300 from a standard mode to an information capture mode (such as a text capture mode) upon receiving an indication or a signal from the detection component 330 that the capture device 300 is in proximity to information to be captured. In addition, the operation adjustment component may change the operational mode of the capture device 300 back to a standard or previous mode of operation upon receiving an indication or a signal from the detection component 330 that the capture device 300 is no longer in proximity to any information. In some cases, the operation adjustment component 340, without changing the mode of operation of the device, launches an application, such as an application configured to capture information and perform an action for a user of the capture device 300.

For example, the capture device 300, when operating in information capture mode or when controlled by a running application launched by the operation adjustment component 340, may perform some or all of the routines and methods described herein, including identifying documents and information associated with captured information, performing actions (e.g., purchasing products, displaying advertisements, presenting supplemental information, updates weblogs, and so on) associated with captured information. The capture device 300 may perform some or all of the routines and methods via programs stored within memory of the capture device 300, such as programs downloaded to the capture device 300, programs integrated into the operating system of the capture device 300, and so on.

The capture device 300 may also include other components, such as device operation components 350 associated with the operation of the device (processing components, memory components, power components, SIM and other security components, input components such as keypads and buttons, and so on), communication components 360 (wireless radios, GSM/cell components, SMS/MMS and other messaging components, Bluetooth™ components, RFID components, and so on) for communicating with an external network and/or other computing device, components 370 that provide contextual information to the device (GPS and other geo-location sensors, accelerometers and other movement sensors, orientation sensors, temperature and other environment measuring components, and so on), and other components 380, such as an audio transducer, external lights, or vibration component to provide feedback to a user and/or buttons, scroll wheels, or tactile sensors for receiving input from a user, or a touch screen to communicate information to users and receive input from users, among other things as described herein.

The capture device 300 may also include a logic component (not shown) to interact with the various other components, possibly processing the received signals into different formats and/or interpretations. The logic component may be operable to read and write data and program instructions stored in associated storage (not shown) such as RAM, ROM, flash, or other suitable memory. The capture device 300 may store or contain information, in the form of data structures, routines, algorithms, scripts, and so on, in memory or other storage components, such as computer-readable media.

The logic component may read a time signal from a clock unit (not shown). In some examples, the capture device may have an on-board power supply (not shown). In other examples, the scanner 302 may be powered from a tethered connection to another device, such as a Universal Serial Bus (USB) connection. In some examples, the capture device 300 may be distributed across multiple separate devices.

2.3.1. Information Aware Capture Devices

The system may include a component for determining that a capture device is proximate to information, such as a rendered document, and changing the operation of the capture device based on the determination. In some examples, the capture device includes a camera that captures images of rendered documents or other displays of information, and a proximity component that detects a proximity to rendered documents or the other displays of information. The proximity component may be or utilize an optical component within the camera, or may be a stand-alone component, such as a proximity sensor. The system, upon determining the capture device is proximate to information, may cause the capture device to change modes to one that is aware of and interacts with text, documents, and/or other displays of information, such as objects that display text. For example, in a document capture mode, the system, via the capture device, may initiate one or more processes that capture images of rendered documents or displays of information and perform actions based on such captures.

Part II—Overview of the Areas of the System

As paper-digital integration becomes more common, there are many aspects of existing technologies that can be changed to take better advantage of this integration, or to enable it to be implemented more effectively. This section highlights some of those issues.

3. Search

Searching a corpus of documents, even so large a corpus as the World Wide Web, has become commonplace for ordinary users, who use a keyboard to construct a search query which is sent to a search engine. This section and the next discuss the aspects of both the construction of a query originated by a capture from a rendered document, and the search engine that handles such a query.

3.1. Capture/Speak/Type as Search Query

Use of the described system typically starts with a few words being captured from a rendered document using any of several methods, including those mentioned above. Where the input needs some interpretation to convert it to text, for example in the case of OCR or speech input, there may be end-to-end feedback in the system so that the document corpus can be used to enhance the recognition process. End-to-end feedback can be applied by performing an approximation of the recognition or interpretation, identifying a set of one or more candidate matching documents, and then using information from the possible matches in the candidate documents to further refine or restrict the recognition or interpretation. Candidate documents can be weighted according to their probable relevance (for example, based on then number of other users who have captured information from these documents, or their popularity on the Internet), and these weights can be applied in this iterative recognition process.

3.2. Short Phrase Searching

Because the selective power of a search query based on a few words is greatly enhanced when the relative positions of these words are known, only a small amount of text need be captured for the system to identify the text's location in a corpus. Most commonly, the input text will be a contiguous sequence of words, such as a short phrase.

3.2.1. Finding Document and Location in Document from Short Capture

In addition to locating the document from which a phrase originates, the system can identify the location in that document and can take action based on this knowledge.

3.2.2. Other Methods of Finding Location

The system may also employ other methods of discovering the document and location, such as by using watermarks or other special markings on the rendered document.

3.3. Incorporation of Other Factors in Search Query

In addition to the captured text, other factors (i.e., information about user identity, profile, and context) may form part of the search query, such as the time of the capture, the identity and geographical location of the user, knowledge of the user's habits and recent activities, etc.

The document identity and other information related to previous captures, especially if they were quite recent, may form part of a search query.

The identity of the user may be determined from a unique identifier associated with a capture device, and/or biometric or other supplemental information (speech patterns, fingerprints, etc.).

3.4. Knowledge of Nature of Unreliability in Search Query (OCR Errors Etc)

The search query can be constructed taking into account the types of errors likely to occur in the particular capture method used. One example of this is an indication of suspected errors in the recognition of specific characters; in this instance a search engine may treat these characters as wildcards, or assign them a lower priority.

3.5. Local Caching of Index for Performance/Offline Use

Sometimes the capture device may not be in communication with the search engine or corpus at the time of the data capture. For this reason, information helpful to the offline use of the device may be downloaded to the device in advance, or to some entity with which the device can communicate. In some cases, all or a substantial part of an index associated with a corpus may be downloaded. This topic is discussed further in Section 15.3.

3.6. Queries, in Whatever Form, May be Recorded and Acted on Later

If there are likely to be delays or cost associated with communicating a query or receiving the results, this pre-loaded information can improve the performance of the local device, reduce communication costs, and provide helpful and timely user feedback.

In the situation where no communication is available (the local device is "offline"), the queries may be saved and transmitted to the rest of the system at such a time as communication is restored.

In these cases it may be important to transmit a timestamp with each query. The time of the capture can be a significant factor in the interpretation of the query. For example, Section 13.1 discusses the importance of the time of capture in relation to earlier captures. It is important to note that the time of capture will not always be the same as the time that the query is executed.

3.7. Parallel Searching

For performance reasons, multiple queries may be launched in response to a single capture, either in sequence or in parallel. Several queries may be sent in response to a single capture, for example as new words are added to the capture, or to query multiple search engines in parallel.

For example, in some examples, the system sends queries to a special index for the current document, to a search engine on a local machine, to a search engine on the corporate network, and to remote search engines on the Internet.

The results of particular searches may be given higher priority than those from others.

The response to a given query may indicate that other pending queries are superfluous; these may be cancelled before completion.

4. Paper and Search Engines

Often it is desirable for a search engine that handles traditional online queries also to handle those originating from rendered documents. Conventional search engines may be enhanced or modified in a number of ways to make them more suitable for use with the described system.

The search engine and/or other components of the system may create and maintain indices that have different or extra features. The system may modify an incoming paper-originated query or change the way the query is handled in the resulting search, thus distinguishing these paper-originated queries from those coming from queries typed into web browsers and other sources. And the system may take different actions or offer different options when the results are returned by the searches originated from paper as compared to those from other sources. Each of these approaches is discussed below.

4.1. Indexing

Often, the same index can be searched using either paper-originated or traditional queries, but the index may be enhanced for use in the current system in a variety of ways.

4.1.1. Knowledge about the Paper Form

Extra fields can be added to such an index that will help in the case of a paper-based search.

Index Entry Indicating Document Availability in Paper Form

The first example is a field indicating that the document is known to exist or be distributed in paper form. The system may give such documents higher priority if the query comes from paper.

Knowledge of Popularity Paper Form

In this example statistical data concerning the popularity of paper documents (and, optionally, concerning sub-regions within these documents)—for example the amount of capture activity, circulation numbers provided by the publisher or other sources, etc—is used to give such documents higher priority, to boost the priority of digital counterpart documents (for example, for browser-based queries or web searches), etc.

Knowledge of Rendered Format

Another important example may be recording information about the layout of a specific rendering of a document.

For a particular edition of a book, for example, the index may include information about where the line breaks and page breaks occur, which fonts were used, any unusual capitalization.

The index may also include information about the proximity of other items on the page, such as images, text boxes, tables and advertisements.

Use of Semantic Information in Original

Lastly, semantic information that can be deduced from the source markup but is not apparent in the paper document, such as the fact that a particular piece of text refers to an item offered for sale, or that a certain paragraph contains program code, may also be recorded in the index.

4.1.2. Indexing in the Knowledge of the Capture Method

A second factor that may modify the nature of the index is the knowledge of the type of capture likely to be used. A search initiated by a captured image of text may benefit if the index takes into account characters that are easily confused in the OCR process, or includes some knowledge of the fonts used in the document. For example, the sequence of the letter "r" followed by the letter "n" may be confused with the letter "m" in the OCR process. Accordingly, the strings "m" or "rn" may be associated with the same sets of documents in the index. Similarly, if the query is from speech recognition, an index based on similar-sounding phonemes may be much more efficiently searched. As another example, the system may artificially blur a document prior to indexing the document to reflect the blur likely to occur as a user captures images of the document by moving a capture device over the document. Similar techniques can make system resilient to poor optics, noise, etc. An additional factor that may affect the use of the index in the described model is the importance of iterative feedback during the recognition process. If the search engine is able to provide feedback from the index as the text is being captured, it can greatly increase the accuracy of the capture.

Indexing Using Offsets

If the index is likely to be searched using the offset-based/autocorrelation OCR methods described in Section 9, in some examples, the system stores the appropriate offset or signature information in an index.

4.1.3. Multiple Indices

Lastly, in the described system, it may be common to conduct searches on many indices. Indices may be maintained on several machines on a corporate network. Partial indices may be downloaded to the capture device, or to a machine close to the capture device. Separate indices may be created for users or groups of users with particular interests, habits or permissions. An index may exist for each file system, each directory, even each file on a user's hard disk. Indexes are published and subscribed to by users and by systems. It will be important, then, to construct indices that can be distributed, updated, merged and separated efficiently.

4.2. Handling the Queries 4.2.1. Knowing the Capture is from Paper

A search engine may take different actions when it recognizes that a search query originated from a paper document. The engine might handle the query in a way that is more tolerant to the types of errors likely to appear in certain capture methods, for example.

It may be able to deduce this from some indicator included in the query (for example a flag indicating the nature of the capture), or it may deduce this from the query itself (for example, it may recognize errors or uncertainties typical of the OCR process).

Alternatively, queries from a capture device can reach the engine by a different channel or port or type of connection than those from other sources, and can be distinguished in that way. For example, some examples of the system will route queries to the search engine by way of a dedicated gateway. Thus, the search engine knows that all queries passing through the dedicated gateway were originated from a paper document.

4.2.2. Use of Context

Section 13 below describes a variety of different factors, which are external to the captured text itself, yet, which can be a significant aid in identifying a document. These include such things as the history of recent captures, the longer-term reading habits of a particular user, the geographic location of a user and the user's recent use of particular electronic documents. Such factors are referred to herein as "context".

Some of the context may be handled by the search engine itself, and be reflected in the search results. For example, the search engine may keep track of a user's capture history, and may also cross-reference this capture history to conventional keyboard-based queries. In such cases, the search engine maintains and uses more state information about each individual user than do most conventional search engines, and each interaction with a search engine may be considered to extend over several searches and a longer period of time than is typical today.

Some of the context may be transmitted to the search engine in the search query (Section 3.3), and may possibly be stored at the engine so as to play a part in future queries. Lastly, some of the context will best be handled elsewhere, and so becomes a filter or secondary search applied to the results from the search engine.

Data-Stream Input to Search

An important input into the search process is the broader context of how the community of users is interacting with the rendered version of the document—for example, which documents are most widely read and by whom. There are analogies with a web search returning the pages that are most frequently linked to, or those that are most frequently selected from past search results. For further discussion of this topic, see Sections 13.4 and 14.2.

4.2.3. Document Sub-Regions

The described system can emit and use not only information about documents as a whole, but also information about sub-regions of documents, even down to individual words. Many existing search engines concentrate simply on locating a document or file that is relevant to a particular query. Those that can work on a finer grain and identify a location within a document will provide a significant benefit for the described system.

4.3. Returning the Results

The search engine may use some of the further information it now maintains to affect the results returned.

The system may also return certain documents to which the user has access only as a result of being in possession of the paper copy (Section 7.4).

The search engine may also offer new actions or options appropriate to the described system, beyond simple retrieval of the text.

5. Markup, Annotations, Enhancement, Metadata

In addition to performing the capture-search-retrieve process, the described system also associates extra functionality with a document, and in particular with specific locations or segments of text within a document. This extra functionality is often, though not exclusively, associated with the rendered document by being associated with its electronic counterpart. As an example, hyperlinks in a web page could have the same functionality when a printout of that web page is captured. In some cases, the functionality is not defined in the electronic document, but is stored or generated elsewhere.

This layer of added functionality is referred to herein as "markup".

5.1. Overlays, Static and Dynamic

One way to think of the markup is as an "overlay" on the document, which provides further information about—and may specify actions associated with—the document or some portion of it. The markup may include human-readable content, but is often invisible to a user and/or intended for machine use. Examples include options to be displayed in a popup-menu on a nearby display when a user captures text from a particular area in a rendered document, or audio samples that illustrate the pronunciation of a particular phrase. As another example, the system may play a jingle associated with an advertisement when a user captures the advertisement from a rendered document.

5.1.1. Several Layers, Possibly from Several Sources

Any document may have multiple overlays simultaneously, and these may be sourced from a variety of locations. Markup data may be created or supplied by the author of the document, or by the user, or by some other party.

Markup data may be attached to the electronic document or embedded in it. It may be found in a conventional location (for example, in the same place as the document but with a different filename suffix). Markup data may be included in the search results of the query that located the original document, or may be found by a separate query to the same or another search engine. Markup data may be found using the original captured text and other capture information or contextual information, or it may be found using already-deduced information about the document and location of the capture. Markup data may be found in a location specified in the document, even if the markup itself is not included in the document.

The markup may be largely static and specific to the document, similar to the way links on a traditional html web page are often embedded as static data within the html document, but markup may also be dynamically generated and/or applied to a large number of documents. An example of dynamic markup is information attached to a document that includes the up-to-date share price of companies mentioned in that document. An example of broadly applied markup is translation information that is automatically available on multiple documents or sections of documents in a particular language.

5.1.2. Personal "Plug-in" Layers

Users may also install, or subscribe to particular sources of, markup data, thus personalizing the system's response to particular captures.

5.2. Keywords and Phrases, Trademarks and Logos

Some elements in documents may have particular "markup" or functionality associated with them based on their own characteristics rather than their location in a particular document. Examples include special marks that are printed in the document purely for the purpose of being captured, as well as logos and trademarks that can link the user to further information about the organization concerned. The same applies to "keywords" or "key phrases" in the text. Organizations might register particular phrases with which they are associated, or with which they would like to be associated, and attach certain markup to them that would be available wherever that phrase was captured.

Any word, phrase, etc. may have associated markup. For example, the system may add certain items to a pop-up menu (e.g., a link to an online bookstore) whenever the user captures the word "book," or the title of a book, or a topic related to books. In some examples, of the system, digital counterpart documents or indices are consulted to determine whether a capture occurred near the word "book," or the title of a book, or a topic related to books—and the system behavior is modified in accordance with this proximity to keyword elements. In the preceding example, note that markup enables data captured from non-commercial text or documents to trigger a commercial transaction.

5.3. User-Supplied Content

5.3.1. User Comments and Annotations, Including Multimedia

Annotations are another type of electronic information that may be associated with a document. For example, a user can attach an audio file of his/her thoughts about a particular document for later retrieval as voice annotations. As another example of a multimedia annotation, a user may attach photographs of places referred to in the document. The user generally supplies annotations for the document but the system can associate annotations from other sources (for example, other users in a work group may share annotations).

5.3.2. Notes from Proof-Reading

An important example of user-sourced markup is the annotation of paper documents as part of a proofreading, editing or reviewing process.

5.4. Third-Party Content

As mentioned earlier, third parties may often supply markup data, such as by other readers of the document. Online discussions and reviews are a good example, as are community-managed information relating to particular works, volunteer-contributed translations and explanations.

Another example of third-party markup is that provided by advertisers.

5.5. Dynamic Markup Based on Other Users' Data Streams

By analyzing the data captured from documents by several or all users of the system, markup can be generated based on the activities and interests of a community. An example might be an online bookstore that creates markup or annotations that tell the user, in effect, "People who enjoyed this book also enjoyed . . . ". The markup may be less anonymous, and may tell the user which of the people in his/her contact list have also read this document recently. Other examples of datastream analysis are included in Section 14.

5.6. Markup Based on External Events and Data Sources

Markup will often be based on external events and data sources, such as input from a corporate database, information from the public Internet, or statistics gathered by the local operating system.

Data sources may also be more local, and in particular may provide information about the user's context—his/her identity, location and activities. For example, the system might communicate with a mobile phone component of the user's capture device and offer a markup layer that gives the user the option to send a document to somebody that the user has recently spoken to on the phone.

5.7 Image Enhancements and Compensation

In some examples, the system provides an enhanced view of a document by overlaying a display showing the document with various display elements. The enhanced view may overlay a real-time image of a portion of the document within a capture device's field of view with various display elements associated with the document, or may present and overlay associated electronic versions or images of the document retrieved or generated by the system with various display elements associated with the document. In some examples, the system provides document interaction techniques that compensate for various hardware configurations of capture devices, such as the locations of cameras and other imaging components with respect to the display or a center point of a document, the size of a capture device and/or the display of the capture device. The system may provide document interaction techniques that enables user to navigate paper documents, identify markup associated with documents, zoom in or out of paper documents, and so on. For example, the system may respond to gestures made by a user of a capture device, such as gestures that move a capture device in various directions relative to a paper document. Thus, the system enables users to interact with paper documents, target objects, and other displays of information using multi-function mobile devices not necessarily manufactured only to interact with information or capture information from the environment around the device, among other benefits.

6. Authentication, Personalization and Security

In many situations, the identity of the user will be known. Sometimes this will be an "anonymous identity", where the user is identified only by the serial number of the capture device, for example. Typically, however, it is expected that the system will have a much more detailed knowledge of the user, which can be used for personalizing the system and to allow activities and transactions to be performed in the user's name.

6.1. User History and "Life Library"

One of the simplest and yet most useful functions that the system can perform is to keep a record for a user of the text that s/he has captured and any further information related to that capture, including the details of any documents found, the location within that document and any actions taken as a result. In some examples, the system may send captured information to a user-specified email address where a user may access the captured information through an email client via an email protocol, such as POP3, IMAP, etc. Furthermore, the captured information, stored as emails, may include a link to a more comprehensive Life Library experience, such as those describe in Section 16.1.

This stored history is beneficial for both the user and the system.

6.1.1. For the User

The user can be presented with a "Life Library", a record of everything s/he has read and captured. This may be simply for personal interest, but may be used, for example, in a library by an academic who is gathering material for the bibliography of his next paper.

In some circumstances, the user may wish to make the library public, such as by publishing it on the web in a similar manner to a weblog, so that others may see what s/he is reading and finds of interest.

Lastly, in situations where the user captures some text and the system cannot immediately act upon the capture (for example, because an electronic version of the document is not yet available) the capture can be stored in the library and can be processed later, either automatically or in response to a user request. A user can also subscribe to new markup services and apply them to previous captures.

6.1.2. For the System

A record of a user's past captures is also useful for the system. Knowing the user's reading habits and history can enhance many aspects of the system operation. The simplest example is that any capture made by a user is more likely to come from a document that the user has captured information from in the recent past, and in particular if the previous capture was within the last few minutes it is very likely to be from the same document. Similarly, it is more likely that a document is being read in start-to-finish order. Thus, for English documents, it is also more likely that later captures will occur farther down in the document. Such factors can help the system establish the location of the capture in cases of ambiguity, and can also reduce the amount of text that needs to be captured.

6.2. Capture Device as Payment, Identity and Authentication Device

Because the capture process generally begins with a device of some sort, the device may be used as a key that identifies the user and authorizes certain actions.

6.2.1. Associate Capture Device with User Account

The capture device may be associated with a mobile phone account. For example, a capture device may be associated with a mobile phone account by inserting a SIM card associated with the account into the capture device. Similarly, the device may be embedded in a credit card or other payment card, or have the facility for such a card to be connected to it. The device may therefore be used as a payment token, and financial transactions may be initiated by the capture from the rendered document.

6.2.2. Using Capture for Authentication

The capture device may also be associated with a particular user or account through the process of capturing a token, symbol or text associated with that user or account. In addition, a capture device may be used for biometric identification, for example by capturing a fingerprint of the user. In the case of an audio-based capture device, the system may identify the user by matching the voice pattern of the user or by requiring the user to speak a certain password or phrase.

For example, where a user captures a quote from a book and is offered the option to buy the book from an online retailer, the user can select this option, and is then prompted to capture his/her fingerprint to confirm the transaction.

See also Sections 15.5 and 15.6.

6.2.3. Secure Capture Device

When the capture device is used to identify and authenticate the user, and to initiate transactions on behalf of the user, it is important that communications between the device and other parts of the system are secure. It is also important to guard against such situations as another device impersonating a capture device, and so-called "man in the middle" attacks where communications between the device and other components are intercepted.

Techniques for providing such security are well understood in the art; in various examples, the hardware and software in the device and elsewhere in the system are configured to implement such techniques.

7. Publishing Models and Elements

An advantage of the described system is that there is no need to alter the traditional processes of creating, printing or publishing documents in order to gain many of the system's benefits. There are reasons, though, that the creators or publishers of a document—hereafter simply referred to as the "publishers"—may wish to create functionality to support the described system.

This section is primarily concerned with the published documents themselves. For information about other related commercial transactions, such as advertising, see Section 10 entitled "P-Commerce".

7.1. Electronic Companions to Printed Documents

The system allows for printed documents to have an associated electronic presence. Conventionally publishers often ship a CD-ROM with a book that contains further digital information, tutorial movies and other multimedia data, sample code or documents, or further reference materials. In addition, some publishers maintain web sites associated with particular publications which provide such materials, as well as information which may be updated after the time of publishing, such as errata, further comments, updated reference materials, bibliographies and further sources of relevant data, and translations into other languages. Online forums allow readers to contribute their comments about the publication.

The described system allows such materials to be much more closely tied to the rendered document than ever before, and allows the discovery of and interaction with them to be much easier for the user. By capturing a portion of text from the document, the system can automatically connect the user to digital materials associated with the document, and more particularly associated with that specific part of the document, and display these materials on the capture device. Similarly, the user can be connected, via the capture device, to online communities that discuss that section of the text, or to annotations and commentaries by other readers. In the past, such information would typically need to be found by searching for a particular page number or chapter.

An example application of this is in the area of academic textbooks (Section 17.5).

7.2. "Subscriptions" to Printed Documents

Some publishers may have mailing lists to which readers can subscribe if they wish to be notified of new relevant matter or when a new edition of the book is published. With the described system, the user can register an interest in particular documents or parts of documents more easily, in some cases even before the publisher has considered providing any such functionality. The reader's interest can be fed to the publisher, possibly affecting their decision about when and where to provide updates, further information, new editions or even completely new publications on topics that have proved to be of interest in existing books.

7.3. Printed Marks with Special Meaning or Containing Special Data

Many aspects of the system are enabled simply through the use of the text already existing in a document. If the document is produced in the knowledge that it may be used in conjunction with the system, however, extra functionality can be added by printing extra information in the form of special marks, which may be used to identify the text or a required action more closely, or otherwise enhance the document's interaction with the system. The simplest and most important example is an indication to the reader that the document is definitely accessible through the system. A special icon might be used, for example, to indicate that this document has an online discussion forum associated with it.

Such symbols may be intended purely for the reader, or they may be recognized by the system when captured and used to initiate some action. Sufficient data may be encoded in the symbol to identify more than just the symbol: it may also store information, for example about the document, edition, and location of the symbol, which could be recognized and read by the system.

7.4. Authorization Through Possession of the Paper Document

There are some situations where possession of or access to the printed document would entitle the user to certain privileges, for example, the access to an electronic copy of the document or to additional materials. With the described system, such privileges could be granted simply as a result of the user capturing portions of text from the document, or capturing specially printed symbols. In cases where the system needed to ensure that the user was in possession of the entire document, it might prompt the user to capture particular items or phrases from particular pages, e.g. "the second line of page 46".

7.5. Documents which Expire

If the printed document is a gateway to extra materials and functionality, access to such features can also be time-limited. After the expiry date, a user may be required to pay a fee or obtain a newer version of the document to access the features again. The paper document will, of course, still be usable, but will lose some of its enhanced electronic functionality. This may be desirable, for example, because there is profit for the publisher in receiving fees for access to electronic materials, or in requiring the user to purchase new editions from time to time, or because there are disadvantages associated with outdated versions of the printed document remaining in circulation. Coupons are an example of a type of commercial document that can have an expiration date.

7.6. Popularity Analysis and Publishing Decisions

Section 10.5 discusses the use of the system's statistics to influence compensation of authors and pricing of advertisements.

In some examples, the system deduces the popularity of a publication from the activity in the electronic community associated with it as well as from the use of the paper document. These factors may help publishers to make decisions about what they will publish in future. If a chapter in an existing book, for example, turns out to be exceedingly popular, it may be worth expanding into a separate publication.

8. Document Access Services

An important aspect of the described system is the ability to provide to a user who has access to a rendered copy of a document access to an electronic version of that document. In some cases, a document is freely available on a public network or a private network to which the user has access. The system uses the captured text to identify, locate and retrieve the document, in some cases displaying it on the capture device or depositing it in their email inbox.

In some cases, a document will be available in electronic form, but for a variety of reasons may not be accessible to the user. There may not be sufficient connectivity to retrieve the document, the user may not be entitled to retrieve it, there may be a cost associated with gaining access to it, or the document may have been withdrawn and possibly replaced by a new version, to name just a few possibilities. The system typically provides feedback to the user about these situations.

As mentioned in Section 7.4, the degree or nature of the access granted to a particular user may be different if it is known that the user already has access to a printed copy of the document.

8.1. Authenticated Document Access

Access to the document may be restricted to specific users, or to those meeting particular criteria, or may only be available in certain circumstances, for example when the user is connected to a secure network. Section 6 describes some of the ways in which the credentials of a user and a capture device may be established.

8.2. Document Purchase—Copyright-Owner Compensation

Documents that are not freely available to the general public may still be accessible on payment of a fee, often as compensation to the publisher or copyright-holder. The system may implement payment facilities directly or may make use of other payment methods associated with the user, including those described in Section 6.2.

8.3. Document Escrow and Proactive Retrieval

Electronic documents are often transient; the digital source version of a rendered document may be available now but inaccessible in the future. The system may retrieve and store the existing version on behalf of the user, even if the user has not requested it, thus guaranteeing its availability should the user request it in the future. This also makes it available for the system's use, for example for searching as part of the process of identifying future captures.

In the event that payment is required for access to the document, a trusted "document escrow" service can retrieve the document on behalf of the user, such as upon payment of a modest fee, with the assurance that the copyright holder will be fully compensated in future if the user should ever request the document from the service.

Variations on this theme can be implemented if the document is not available in electronic form at the time of capture. The user can authorize the service to submit a request for or make a payment for the document on his/her behalf if the electronic document should become available at a later date.

8.4. Association with Other Subscriptions and Accounts

Sometimes payment may be waived, reduced or satisfied based on the user's existing association with another account or subscription. Subscribers to the printed version of a newspaper might automatically be entitled to retrieve the electronic version, for example.

In other cases, the association may not be quite so direct: a user may be granted access based on an account established by their employer, or based on their capture of a printed copy owned by a friend who is a subscriber.

8.5. Replacing Photocopying with Capture-and-Print

The process of capturing text from a paper document, identifying an electronic original, and printing that original, or some portion of that original associated with the capture, forms an alternative to traditional photocopying with many advantages:

- the paper document need not be in the same location as the final printout, and in any case need not be there at the same time
- the wear and damage caused to documents by the photocopying process, especially to old, fragile and valuable documents, can be avoided
- the quality of the copy is typically much higher
- records may be kept about which documents or portions of documents are the most frequently copied
- payment may be made to the copyright owner as part of the process
- unauthorized copying may be prohibited

8.6. Locating Valuable Originals from Photocopies

When documents are particularly valuable, as in the case of legal instruments or documents that have historical or other particular significance, people may typically work from copies of those documents, often for many years, while the originals are kept in a safe location.

The described system could be coupled to a database which records the location of an original document, for example in an archiving warehouse, making it easy for somebody with access to a copy to locate the archived original paper document.

9. Information Processing Technologies

Optical Character Recognition (OCR) technologies have traditionally focused on images that include a large amount of text, for example from a flat-bed scanner capturing a whole page. OCR technologies often need substantial training and correcting by the user to produce useful text. OCR technologies often require substantial processing power on the machine doing the OCR, and, while many systems use a dictionary, they are generally expected to operate on an effectively infinite vocabulary.

All of the above traditional characteristics may be improved upon in the described system. However, the techniques described herein, such as the recognition of text, identification of documents, detection of information, and others, may of course be implemented using typical OCR technologies.

Many of the issues discussed map directly onto other recognition technologies, in particular speech recognition. As mentioned in Section 3.1, the process of capturing from paper may be achieved by a user reading the text aloud into a device, which captures audio. Those skilled in the art will appreciate that principles discussed here with respect to images, fonts, and text fragments often also apply to audio samples, user speech models and phonemes.

A capture device for use with the described system will often be small, portable, and low power, or not be manufactured to only capture text. The capture device may have optical elements that are not ideally suited for OCR, or may lack optical elements that assist in OCR.

The capture device may capture only a few words at a time, and in some implementations does not even capture a whole character at once, but rather a horizontal slice through the text, many such slices being stitched together to form a recognizable signal from which the text may be deduced. The capture device may also have very limited processing power or storage so, while in some examples it may perform all of the OCR process itself, many examples will depend on a connection to a more powerful device, possibly at a later time, to convert the captured signals into text. Lastly, it may have very limited facilities for user interaction, so may need to defer any requests for user input until later, or operate in a "best-guess" mode to a greater degree than is common now.

In some examples, the system processes captured information by first identifying the presence of information of interest to be recognized, such as text or speech, extracting features corresponding to the location of the information of interest within the captured information, such as the position of words, lines, paragraphs, columns, etc. within a page or the frequency range for a specific speaker within a crowd, and recognizing characteristics of the information of interest, such as the layout of text within a rendered document or the identification of Unicode characters corresponding to recognized letters within a rendered document, in order to, for example, identify the source of the captured image or generate and display a markup layer over the captured image. Although these processes can be performed on any type of information, the examples below describe these processes with respect to text-based rendered documents.

9.1 Identification and Extraction

Identification is the process of determining the likelihood that a captured image contains text. Because the capture device may be constantly capturing images, the system may first determine whether a captured image contains text before attempting to extract text features from the captured information or recognizing the text. In other words, the system is "text aware" in that at any time it can determine whether it is in the presence of text.

Once the system determines that text is present, the system may begin the extraction process. The extraction process identifies the location of the text within a capture. For example, the extraction process may generate boundaries corresponding to words and paragraphs within the captured image.

Several factors may go into the Identification and Extraction processes. For example, when analyzing text, the system may identify various features associated with strokes within the text, such as the existence of high contrast edges, the lack of color variation within strokes (e.g., comparing the existence of background vs. foreground colors within a stroke), consistent width (horizontally, vertically, or both), the existence of straight edges, the existence of smooth edge curves, etc. As another example, the system may identify the periodicity or repetition of characteristics of potential text within a captured image, such as stroke edges, the presence of horizontal and/or vertical strokes, baselines, height lines, angles between dominant vertical lines and baselines, the presence of glyphs or glyph sub-components (e.g., corners, curves, diagonals, bridges between portions of a glyph, such as a narrow stroke between wide strokes in a calligraphic letter, serifs, consistent line caps and miters, and so on). The system may also use motion blur to identify the presence of text based on the presence of light and dark colored bands in the direction of motion, such as background and foreground banding in the case of extreme motion blur along the horizontal text axis in left-to-right scripts.

Additional factors that may be considered during the identification and extraction of text include:

```
Lines
    Glyph verticals within a line
    Glyph horizontals within a line
    Baseline
    Height of glyphs or symbols within a line
    Horizontal spaces between glyphs, words, and/or strokes
    Vertical spaces between lines
    Edges and Margins
Densities
    Stroke to background ratios
    Density within arid between lines
Glyph sequences
    N-grams (sequence of N consecutive words)
Words
Capitals
Punctuation
Sentences (capital, punctuation, period)
Paragraphs
Headings
Captions
    Based on proximity to an image
Legends
    Boxes, icons, etc.
Text on graphics
    Short text
    Greater contrast, periodicity, etc. than background image
Logos
    Company/product/service names
    Major business logos
    Demarcation from background (e.g. oval borders).
```

One skilled in the art will understand that the system may use any or all of the above features when performing text identification and extraction and at any level of analysis. For example, during the identification process, the system may rely solely on the number of horizontal spaces between glyphs while relying on distances between the horizontal spaces and their relationship to edges within the captured image during the extraction processes.

The system may also perform identification and extraction on non-text information based on, for example, large areas of smooth gradients, randomness (e.g., position of high contrast locations, length of high contrast edges, unevenness of high contrast edges), the presence of faces, bodies, or building within a captured image, inconsistent sizes of lines or connected components, etc.

9.2. Text Recognition

Based on the extracted location information, the system can attempt to recognize the text or features of the text within the captured image. For example, the system may send the text to an OCR component or generate a signature based on identified features of the text (e.g., patterns of ascenders and/or descenders within the text). Prior to performing text recognition, the system may normalize or canonicalize text by, for example, converting all italicized or bold text to a standard formatting.

The Text Recognition process may rely on several features to recognize characteristics of the text or generate a signature for a rendered document, such as glyph features (e.g., enclosed spaces, vertical and horizontal strokes, etc.), punctuation, capitalization, characters spaces, line features, paragraph features, column features, heading features, caption features, key/legend features, logo features, text-on-graphic features, etc. Additionally, word features may assist in the text recognition process, such as word spacing and densities. For example, the system may use information associated with spaces between words printed on a document, such as distances between spaces (horizontally, vertically, orthogonally, and so on), the width of the spaces, and so on. The system may further incorporate knowledge about line breaks into the analysis. For example, when line breaks are known, the system may rely on the vertical alignment of word positions whereas when line breaks are unknown, the system may rely on proximate sequences of relative word lengths. As another example, the system may use information associated with densities of characters, such as relative densities between characters (horizontally, vertically, orthogonally, and so on), relative densities between grouped pairs of characters, or absolute density information. Certain features may be invariant to font, font size, etc., such as point and line symmetries (e.g., auto-correlations within glyphs, around points and/or lines). The system may dynamically select which features to analyze within a captured image. For example, in the presence of optical and motion blur, the system may use less-detailed aspects of the text, such as relative word widths. In some examples, the system may leverage unique n-grams by determining whether unknown or infrequent n-grams are noise, or high-signal information (misspellings, email addresses, URLs, etc.) based on, for example, certainty of characters deviating from common n-grams, length of deviation, matching regular expressions, (e.g. for email addresses and URLs), and so on.

The system may use resources external to a rendered document to recognize text within the rendered document, such as knowledge pertaining to the approximate number of glyphs within a word, dictionaries (e.g., word frequency dictionaries), grammar and punctuation rules, probabilities of finding particular word-grams and character-grams within a corpus, regular expressions for matching various strings, such as email addresses, URL, and so on. Furthermore, the system may use resources such as DNS servers, address books, and phone books to verify recognized text, such as URLS, emails addresses, and telephone numbers. As another example, the system may use font matrices to assist in the recognition and verification of various glyphs. Unrecognized characters in a given font may be compared to recognized characters in the same font to assist in their recognition based on the relationship between the unrecognized and recognized characters reflected in a font matrix. By way of example, an unrecognized "d" may be recognized as a "d" based on a recognized "c" and "l" if a font matrix indicates that the representation of a "d" is similar to the combination of "c" and "l."

The system may use the recognized text or features to identify the document depicted in the captured image among the documents in a document corpus. The amount and type of information used to identify may vary based on any number of factors, such as the type of document, the size of the corpus, the document contents, etc. For example, a sequence of 5 or 6 words within a captured image or the relative position of spaces between words may uniquely identify a corresponding document within a relatively large corpus. In some examples, the system may employ a conversion table to determine the probability that information about certain features, or the combination of information pertaining to certain features, will uniquely identify a document. For example, the conversation table may indicate that a 5 word sequence of words has the same probability of uniquely identifying a document as two different 3 word sequences, the ascender/descender pattern of 2 consecutive lines, and so on. In some examples, the system may automatically accumulate or "stitch" together captured images to, for example, generate a composite image of a rendered document that is more likely to uniquely identify a corresponding document than the captured images individually.

In some examples, the Text Recognition process may influence the capture of information. For example, if the Text is recognized as out of focus or incomplete, the system can adjust the focus of the camera of the capture device or prompt the user to reposition or adjust the capture device. Various techniques that the system may employ to recognize text are described in further detail below.

9.2.1 "Uncertain" OCR

The primary new characteristic of OCR within the described system is the fact that it will, in general, examine images of text which exists elsewhere and which may be retrieved in digital form. An exact transcription of the text is therefore not always required from the OCR engine. The OCR system may output a set or a matrix of possible matches, in some cases including probability weightings, which can still be used to search for the digital original.

9.2.2 Iterative OCR—Guess, Disambiguate, Guess . . . .

If the device performing the recognition is able to contact the document index at the time of processing, then the OCR process can be informed by the contents of the document corpus as it progresses, potentially offering substantially greater recognition accuracy.

Such a connection will also allow the device to inform the user when sufficient text has been captured to identify the digital source.

9.2.3 Using Knowledge of Likely Rendering

When the system has knowledge of aspects of the likely printed rendering of a document—such as the font typeface used in printing, or the layout of the page, or which sections are in italics—this too can help in the recognition process. (Section 4.1.1).

9.2.4 Font Caching—Determine Font on Host, Download to Client

As candidate source texts in the document corpus are identified, the font, or a rendering of it, may be downloaded to the device to help with the recognition.

9.2.5 Autocorrelation and Character Offsets

While component characters of a text fragment may be the most recognized way to represent a fragment of text that may be used as a document signature, other representations of the text may work sufficiently well that the actual text of a text fragment need not be used when attempting to locate the text fragment in a digital document and/or database, or when disambiguating the representation of a text fragment into a readable form. Other representations of text fragments may provide benefits that actual text representations lack. For example, optical character recognition of text fragments is often prone to errors, unlike other representations of captured text fragments that may be used to search for and/or recreate a text fragment without resorting to optical character recognition for the entire fragment. Such methods may be more appropriate for some devices used with the current system.

Those of ordinary skill in the art and others will appreciate that there are many ways of describing the appearance of text fragments. Such characterizations of text fragments may include, but are not limited to, word lengths, relative word lengths, character heights, character widths, character shapes, character frequencies, token frequencies, and the like. In some examples, the offsets between matching text tokens (i.e., the number of intervening tokens plus one) are used to characterize fragments of text.

Conventional OCR uses knowledge about fonts, letter structure and shape to attempt to determine characters in scanned text. Examples of the present invention are different; they employ a variety of methods that use the rendered text itself to assist in the recognition process. These use characters (or tokens) to "recognize each other." One way to refer to such self-recognition is "template matching," and is similar to "convolution." To perform such self-recognition, the system slides a copy of the text horizontally over itself and notes matching regions of the text images. Prior template matching and convolution techniques encompass a variety of related techniques. These techniques to tokenize and/or recognize characters/tokens will be collectively referred to herein as "autocorrelation," as the text is used to correlate with its own component parts when matching characters/tokens.

When autocorrelating, complete connected regions that match are of interest. This occurs when characters (or groups of characters) overlay other instances of the same character (or group). Complete connected regions that match automatically provide tokenizing of the text into component tokens. As the two copies of the text are slid past each other, the regions where perfect matching occurs (i.e., all pixels in a vertical slice are matched) are noted. When a character/token matches itself, the horizontal extent of this matching (e.g., the connected matching portion of the text) also matches.

Note that at this stage there is no need to determine the actual identity of each token (i.e., the particular letter, digit or symbol, or group of these, that corresponds to the token image), only the offset to the next occurrence of the same token in the captured text. The offset number is the distance (number of tokens) to the next occurrence of the same token. If the token is unique within the text string, the offset is zero (0). The sequence of token offsets thus generated is a signature that can be used to identify the captured text.

In some examples, the token offsets determined for a string of captured tokens are compared to an index that indexes a corpus of electronic documents based upon the token offsets of their contents (Section 4.1.2). In other examples, the token offsets determined for a string of captured tokens are converted to text, and compared to a more conventional index that indexes a corpus of electronic documents based upon their contents As has been noted earlier, a similar token-correlation process may be applied to speech fragments when the capture process consists of audio samples of spoken words.

9.2.6 Font/Character "Self-Recognition"

Conventional template-matching OCR compares scanned images to a library of character images. In essence, the alphabet is stored for each font and newly scanned images are compared to the stored images to find matching characters. The process generally has an initial delay until the correct font has been identified. After that, the OCR process is relatively quick because most documents use the same font throughout. Subsequent images can therefore be converted to text by comparison with the most recently identified font library.

The shapes of characters in most commonly used fonts are related. For example, in most fonts, the letter "c" and the letter "e" are visually related—as are "t" and "f", etc. The OCR process is enhanced by use of this relationship to construct templates for letters that have not been scanned yet. For example, where a reader captures a short string of text from a paper document in a previously unencountered font such that the system does not have a set of image templates with which to compare the captured images the system can leverage the probable relationship between certain characters to construct the font template library even though it has not yet encountered all of the letters in the alphabet. The system can then use the constructed font template library to recognize subsequently captured text and to further refine the constructed font library.

9.2.7 Send Anything Unrecognized (Including Graphics) to Server

When images cannot be machine-transcribed into a form suitable for use in a search process, the images themselves can be saved for later use by the user, for possible manual transcription, or for processing at a later date when different resources may be available to the system.

10. P-Commerce

Many of the actions made possible by the system result in some commercial transaction taking place. The phrase p-commerce is used herein to describe commercial activities initiated from paper via the system.

10.1. Sales of Documents from their Physical Printed Copies.

When a user captures text from a document, the user may be offered that document for purchase either in paper or electronic form. The user may also be offered related documents, such as those quoted or otherwise referred to in the paper document, or those on a similar subject, or those by the same author.

10.2. Sales of Anything Else Initiated or Aided by Paper

The capture of text may be linked to other commercial activities in a variety of ways. The captured text may be in a catalog that is explicitly designed to sell items, in which case the text will be associated fairly directly with the purchase of an item (Section 18.2). The text may also be part of an advertisement, in which case a sale of the item being advertised may ensue.

In other cases, the user captures other text from which their potential interest in a commercial transaction may be deduced. A reader of a novel set in a particular country, for example, might be interested in a holiday there. Someone reading a review of a new car might be considering purchasing it. The user may capture a particular fragment of text knowing that some commercial opportunity will be presented to them as a result, or it may be a side-effect of their capture activities.

10.3. Capture of Labels, Icons, Serial Numbers, Barcodes on an Item Resulting in a Sale Sometimes text or symbols are actually printed on an item or its packaging. An example is the serial number or product id often found on a label on the back or underside of a piece of electronic equipment. The system can offer the user a convenient way to purchase one or more of the same items by capturing that text. They may also be offered manuals, support or repair services.

10.4. Contextual Advertisements

In addition to the direct capture of text from an advertisement, the system allows for a new kind of advertising which is not necessarily explicitly in the rendered document, but is nonetheless based on what people are reading.

10.4.1. Advertising Based on Capture Context and History

In a traditional paper publication, advertisements generally consume a large amount of space relative to the text of a newspaper article, and a limited number of them can be placed around a particular article. In the described system, advertising can be associated with individual words or phrases, and can be selected according to the particular interest the user has shown by capturing that text and possibly taking into account their capture history.

With the described system, it is possible for a purchase to be tied to a particular printed document and for an advertiser to get significantly more feedback about the effectiveness of their advertising in particular print publications.

10.4.2. Advertising Based on User Context and History

The system may gather a large amount of information about other aspects of a user's context for its own use (Section 13); estimates of the geographical location of the user are a good example. Such data can also be used to tailor the advertising presented to a user of the system.

10.5. Models of Compensation

The system enables some new models of compensation for advertisers and marketers. The publisher of a printed document containing advertisements may receive some income from a purchase that originated from their document. This may be true whether or not the advertisement existed in the original printed form; it may have been added electronically either by the publisher, the advertiser or some third party, and the sources of such advertising may have been subscribed to by the user.

10.5.1. Popularity-Based Compensation

Analysis of the statistics generated by the system can reveal the popularity of certain parts of a publication (Section 14.2). In a newspaper, for example, it might reveal the amount of time readers spend looking at a particular page or article, or the popularity of a particular columnist. In some circumstances, it may be appropriate for an author or publisher to receive compensation based on the activities of the readers rather than on more traditional metrics such as words written or number of copies distributed. An author whose work becomes a frequently read authority on a subject might be considered differently in future contracts from one whose books have sold the same number of copies but are rarely opened. (See also Section 7.6).

10.5.2. Popularity-Based Advertising

Decisions about advertising in a document may also be based on statistics about the readership. The advertising space around the most popular columnists may be sold at a premium rate. Advertisers might even be charged or compensated some time after the document is published based on knowledge about how it was received.

10.6. Marketing Based on Life Library

The "Life Library" or capture history described in Sections 6.1 and 16.1 can be an extremely valuable source of information about the interests and habits of a user. Subject to the appropriate consent and privacy issues, such data can inform offers of goods or services to the user. Even in an anonymous form, the statistics gathered can be exceedingly useful.

10.7. Sale/Information at Later Date (when Available)

Advertising and other opportunities for commercial transactions may not be presented to the user immediately at the time of capture. For example, the opportunity to purchase a sequel to a novel may not be available at the time the user is reading the novel, but the system may present them with that opportunity when the sequel is published.

A user may capture data that relates to a purchase or other commercial transaction, but may choose not to initiate and/or complete the transaction at the time the capture is made. In some examples, data related to captures is stored in a user's Life Library, and these Life Library entries can remain "active" (i.e., capable of subsequent interactions similar to those available at the time the capture was made). Thus a user may review a capture at some later time, and optionally complete a transaction based on that capture. Because the system can keep track of when and where the original capture occurred, all parties involved in the transaction can be properly compensated. For example, the author who wrote the story—and the publisher who published the story—that appeared next to the advertisement from which the user captured data can be compensated when, six months later, the user visits their Life Library, selects that particular capture from the history, and chooses "Purchase this item at Amazon" from the pop-up menu (which can be similar or identical to the menu optionally presented at the time of the capture).

11. Operating System and Application Integration

Modern Operating Systems (OSs) and other software packages have many characteristics that can be advantageously exploited for use with the described system, and may also be modified in various ways to provide an even better platform for its use.

11.1. Incorporation of Capture and Print-Related Information in Metadata and Indexing New and upcoming file systems and their associated databases often have the ability to store a variety of metadata associated with each file. Traditionally, this metadata has included such things as the ID of the user who created the file, the dates of creation, last modification, and last use. Newer file systems allow such extra information as keywords, image characteristics, document sources and user comments to be stored, and in some systems this metadata can be arbitrarily extended. File systems can therefore be used to store information that would be useful in implementing the current system. For example, the date when a given document was last printed can be stored by the file system, as can details about which text from it has been captured from paper using the described system, and when and by whom.

Operating systems are also starting to incorporate search engine facilities that allow users to find local files more easily. These facilities can be advantageously used by the system. It means that many of the search-related concepts discussed in Sections 3 and 4 apply not just to today's Internet-based and similar search engines, but also to every personal computer.

In some cases specific software applications will also include support for the system above and beyond the facilities provided by the OS.

11.2. OS Support for Capture Devices

As the use of capture devices such as mobile communication devices with integrated cameras and microphones becomes increasingly common, it will become desirable to build support for them into the operating system, in much the same way as support is provided for mice and printers, since the applicability of capture devices extends beyond a single software application. The same will be true for other aspects of the system's operation. Some examples are discussed below. In some examples, the entire described system, or the core of it, is provided by the OS (e.g., Windows, Windows Mobile, Linux, Max OS X, iPhone OS, Android, or Symbian). In some examples, support for the system is provided by Application Programming Interfaces (APIs) that can be used by other software packages, including those directly implementing aspects of the system.

11.2.1. Support for OCR and Other Recognition Technologies

Most of the methods of capturing text from a rendered document require some recognition software to interpret the source data, typically a captured image or some spoken words, as text suitable for use in the system. Some OSs include support for speech or handwriting recognition, though it is less common for OSs to include support for OCR, since in the past the use of OCR has typically been limited to a small range of applications.

As recognition components become part of the OS, they can take better advantage of other facilities provided by the OS. Many systems include spelling dictionaries, grammar analysis tools, internationalization and localization facilities, for example, all of which can be advantageously employed by the described system for its recognition process, especially since they may have been customized for the particular user to include words and phrases that he/she would commonly encounter.

If the operating system includes full-text indexing facilities, then these can also be used to inform the recognition process, as described in Section 9.3.

11.2.2. Action to be Taken on Captures

If a capture occurs and is presented to the OS, it may have a default action to be taken under those circumstances in the event that no other subsystem claims ownership of the capture. An example of a default action is presenting the user with a choice of alternatives, or submitting the captured data to the OS's built-in search facilities.

11.2.3. OS has Default Action for Particular Documents or Document Types

If the digital source of the rendered document is found, the OS may have a standard action that it will take when that particular document, or a document of that class, is captured. Applications and other subsystems may register with the OS as potential handlers of particular types of capture, in a similar manner to the announcement by applications of their ability to handle certain file types.

Markup data associated with a rendered document, or with a capture from a document, can include instructions to the operating system to launch specific applications, pass applications arguments, parameters, or data, etc.

11.2.4. Interpretation of Gestures and Mapping into Standard Actions

In Section 12.1.3 the use of "gestures" is discussed, where particular movements made with a capture device might represent standard actions such as marking the start and end of a region of text.

This is analogous to actions such as pressing the shift key on a keyboard while using the cursor keys to select a region of text, or using the wheel on a mouse to scroll a document. Such actions by the user are sufficiently standard that they are interpreted in a system-wide way by the OS of the capture device, thus ensuring consistent behavior. The same is desirable for other capture device-related actions.

11.2.5. Set Response to Standard (and Non-Standard) Iconic/Text Printed Menu Items In a similar way, certain items of text or other symbols may, when captured, cause standard actions to occur, and the OS may provide a selection of these. An example might be that capturing the text "[print]" in any document would cause the OS to retrieve and print a copy of that document. The OS may also provide a way to register such actions and associate them with particular captures.

11.3. Support in System Graphical User Interface Components for Typical Capture-Initiated Activities Most software applications are based substantially on standard Graphical User Interface (GUI) components provided by the OS.

Use of these components by developers helps to ensure consistent behavior across multiple packages, for example that pressing the left-cursor key in any text-editing context should move the cursor to the left, without every programmer having to implement the same functionality independently.

A similar consistency in these components is desirable when the activities are initiated by text-capture or other aspects of the described system. Some examples are given below.

11.3.1. Interface to Find Particular Text Content

A typical use of the system may be for the user to capture an area of a paper document, and for the system to open the electronic counterpart in a software package that is able to display or edit it, and cause that package to scroll to and highlight the scanned text (Section 12.2.1). The first part of this process, finding and opening the electronic document, is typically provided by the OS and is standard across software packages. The second part, however—locating a particular piece of text within a document and causing the package to scroll to it and highlight it—is not yet standardized and is often implemented differently by each package. The availability of a standard API for this functionality could greatly enhance the operation of this aspect of the system.

11.3.2. Text Interactions

Once a piece of text has been located within a document, the system may wish to perform a variety of operations upon that text. As an example, the system may request the surrounding text, so that the user's capture of a few words could result in the system accessing the entire sentence or paragraph containing them. Again, this functionality can be usefully provided by the OS rather than being implemented in every piece of software that handles text.

11.3.3. Contextual (Popup) Menus

Some of the operations that are enabled by the system will require user feedback, and this may be optimally requested within the context of the application handling the data. In some examples, the system uses the application pop-up menus traditionally associated with clicking the right mouse button on some text. The system inserts extra options into such menus, and causes them to be displayed as a result of activities such as capturing a portion of a paper document.

11.4. Web/Network Interfaces

In today's increasingly networked world, much of the functionality available on individual machines can also be accessed over a network, and the functionality associated with the described system is no exception. As an example, in an office environment, many paper documents received by a user may have been printed by other users' machines on the same corporate network. The system on one computer, in response to a capture, may be able to query those other machines for documents which may correspond to that capture, subject to the appropriate permission controls.

11.5. Printing of Document Causes Saving

An important factor in the integration of paper and digital documents is maintaining as much information as possible about the transitions between the two. In some examples, the OS keeps a simple record of when any document was printed and by whom. In some examples, the OS takes one or more further actions that would make it better suited for use with the system. Examples include:

Saving the digital rendered version of every document printed along with information about the source from which it was printed Saving a subset of useful information about the printed version—for example, the fonts used and where the line breaks occur—which might aid future capture interpretation Saving the version of the source document associated with any printed copy Indexing the document automatically at the time of printing and storing the results for future searching

11.6. My (Printed/Captured) Documents

An OS often maintains certain categories of folders or files that have particular significance. A user's documents may, by convention or design, be found in a "My Documents" folder, for example. Standard file-opening dialogs may automatically include a list of recently opened documents.

On an OS optimized for use with the described system, such categories may be enhanced or augmented in ways that take into account a user's interaction with paper versions of the stored files. Categories such as "My Printed Documents" or "My Recently-Read Documents" might usefully be identified and incorporated in its operations.

11.7. OS-Level Markup Hierarchies

Since important aspects of the system are typically provided using the "markup" concepts discussed in Section 5, it would clearly be advantageous to have support for such markup provided by the OS in a way that was accessible to multiple applications as well as to the OS itself. In addition, layers of markup may be provided by the OS, based on its own knowledge of documents under its control and the facilities it is able to provide.

11.8. Use of OS DRM Facilities

An increasing number of operating systems support some form of "Digital Rights Management": the ability to control the use of particular data according to the rights granted to a particular user, software entity or machine. It may inhibit unauthorized copying or distribution of a particular document, for example.

12. User Interface

The user interface of the system may be entirely on the capture device, if it is sophisticated and with significant processing power of its own, such as a mobile phone or PDA, or entirely on a PC, if the capture device is relatively dumb and is connected to it by a cable. In some cases, some functionality resides in each component.

The descriptions in the following sections are therefore indications of what may be desirable in certain implementations, but they are not, necessarily appropriate for all and may be modified in several ways.

12.1. On the Capture Device

With most capture devices, the user's attention will generally be on the device and the paper at the time of capture. It is very desirable, then, that any input and feedback needed as part of the process of capturing do not require the user's attention to be elsewhere, for example on the screen of a computer, more than is necessary.

12.1.1. Feedback on Capture Device

A capture device may have a variety of ways of providing feedback to the user about particular conditions. The most obvious types are direct visual, where the capture device incorporates a full display of captured images or indicator lights, and auditory, where the capture device can make beeps, clicks or other sounds. Important alternatives include tactile feedback, where the capture device can vibrate, buzz, or otherwise stimulate the user's sense of touch, and projected feedback, where it indicates a status by projecting onto the paper anything from a colored spot of light to a sophisticated display.

Important immediate feedback that may be provided on the capture device includes:

feedback on the capture process—user moving the capture device too fast, at too great an angle, or drifting too high or low sufficient content—enough has been captured to be pretty certain of finding a match if one exists—important for disconnected operation context known—a source of the text has been located unique context known—one unique source of the text has been located availability of content—indication of whether the content is freely available to the user, or at a cost Many of the user interactions normally associated with the later stages of the system may also take place on the capture device if it has sufficient abilities, for example, to display part or all of a document.

12.1.2. Controls on Capture Device

The capture device may provide a variety of ways for the user to provide input in addition to basic text capture, such as buttons, scroll/jog-wheels, touch-sensitive surfaces, and/or accelerometers for detecting the movement of the device. Some of these allow a richer set of interactions while still holding the capture device.

For example, in response to capturing some text, the capture device presents the user with a set of several possible matching documents. The user uses a touch-sensitive surface of the capture device to select one from the list.

12.1.3. Gestures

The primary reason for moving a capture device across the paper is to capture text, but some movements may be detected by the device and used to indicate other user intentions. Such movements are referred to herein as "gestures".

As an example, the user can indicate a large region of text by capturing the first few words in a left-to-right motion, and the last few in a right to left motion. The user can also indicate the vertical extent of the text of interest by moving the capture device down the page over several lines. A backwards motion during capture might indicate cancellation of the previous capture operation.

12.1.4. Online/Offline Behavior

Many aspects of the system may depend on network connectivity, either between components of the system such as a capture device and a wireless network, or with the outside world in the form of a connection to corporate databases and Internet search. This connectivity may not be present all the time, however, and so there will be occasions when part or all of the system may be considered to be "offline". It is desirable to allow the system to continue to function usefully in those circumstances.

The capture device may be used to capture text when it is out of contact with other parts of the system. A very simple device may simply be able to store the image or audio data associated with the capture, ideally with a timestamp indicating when it was captured. The various captures may be uploaded to the rest of the system when the capture device is next in contact with it, and handled then. The capture device may also upload other data associated with the captures, for example voice annotations or location information.

More sophisticated devices may be able to perform some or all of the system operations themselves despite being disconnected. Various techniques for improving their ability to do so are discussed in Section 15.3. Often it will be the case that some, but not all, of the desired actions can be performed while offline. For example, the text may be recognized, but identification of the source may depend on a connection to an Internet-based search engine. In some examples, the device therefore stores sufficient information about how far each operation has progressed for the rest of the system to proceed efficiently when connectivity is restored.

The operation of the system will, in general, benefit from immediately available connectivity, but there are some situations in which performing several captures and then processing them as a batch can have advantages. For example, as discussed in Section 13 below, the identification of the source of a particular capture may be greatly enhanced by examining other captures made by the user at approximately the same time. In a system where live feedback is being provided to the user, the system is only able to use past captures when processing the current one. If the capture is one of a batch stored by the device when offline, however, the system will be able to take into account any data available from later captures as well as earlier ones when doing its analysis.

12.2. On a Host Device

A capture device may communicate with some other device, such as a PC to perform many of the functions of the system, including more detailed interactions with the user.

12.2.1. Activities Performed in Response to a Capture

When the host device receives a capture, it may initiate a variety of activities. An incomplete list of possible activities performed by the system after locating and electronic counterpart document associated with the capture and a location within that document follows.

The details of the capture may be stored in the user's history. (Section 6.1)

The document may be retrieved from local storage or a remote location. (Section 8)

The operating system's metadata and other records associated with the document may be updated. (Section 11.1)

Markup associated with the document may be examined to determine the next relevant operations. (Section 5)

A software application may be started to edit, view or otherwise operate on the document. The choice of application may depend on the source document, or on the contents of the capture, or on some other aspect of the capture. (Section 11.2.2, 11.2.3)

The application may scroll to, highlight, move the insertion point to, or otherwise indicate the location of the capture. (Section 11.3)

The precise bounds of the captured text may be modified, for example to select whole words, sentences or paragraphs around the captured text. (Section 11.3.2)

The user may be given the option to copy the capture text to the clipboard or perform other standard operating system or application-specific operations upon it.

Annotations may be associated with the document or the captured text. These may come from immediate user input, or may have been captured earlier, for example in the case of voice annotations associated with a captured image. (Section 19.4)

Markup may be examined to determine a set of further possible operations for the user to select.

12.2.2. Contextual Popup Menus

Sometimes the appropriate action to be taken by the system will be obvious, but sometimes it will require a choice to be made by the user. One good way to do this is through the use of "popup menus" or so-called "contextual menus" that appear close to the content on the display of the capture device. (See Section 11.3.3). In some examples, the capture device projects a popup menu onto the paper document. A user may select from such menus using traditional methods such as a keyboard and mouse, or by using controls on the capture device (Section 12.1.2), gestures (Section 12.1.3), or by interacting with the computer display using a capture device (Section 12.2.4). In some examples, the popup menus which can appear as a result of a capture include default items representing actions which occur if the user does not respond—for example, if the user ignores the menu and makes another capture.

12.2.3. Feedback on Disambiguation

When a user starts capturing text, there will initially be several documents or other text locations that it could match. As more text is captured, and other factors are taken into account (Section 13), the number of candidate locations will decrease until the actual location is identified, or further disambiguation is not possible without user input. In some examples, the system provides a real-time display of the documents or the locations found, for example in list, thumbnail-image or text-segment form, and for the number of elements in that display to reduce in number as capture continues. In some examples, the system displays thumbnails of all candidate documents, where the size or position of the thumbnail is dependent on the probability of it being the correct match.

When a capture is unambiguously identified, this fact may be emphasized to the user, for example using audio feedback.

Sometimes the text captured will occur in many documents and will be recognized to be a quotation. The system may indicate this on the screen, for example by grouping documents containing a quoted reference around the original source document.

12.2.4. Capturing from Screen

Some capture devices may be able to capture text displayed on a screen as well as on paper. Accordingly, the term rendered document is used herein to indicate that printing onto paper is not the only form of rendering, and that the capture of text or symbols for use by the system may be equally valuable when that text is displayed on an electronic display.

The user of the described system may be required to interact with a computer screen for a variety of other reasons, such as to select from a list of options. Other sections have described physical controls on the capture device (Section 12.1.2) or gestures (Section 12.1.3) as methods of input which may be convenient even when capturing information form a display device associated with alternative input methods, such as a keyboard or mouse.

In some examples, the capture device can sense its position on the screen without the need for processing captured text, possibly with the aid of special hardware or software on the computer.

13. Context Interpretation

An important aspect of the described system is the use of other factors, beyond the simple capture of a string of text, to help identify the document in use. A capture of a modest amount of text may often identify the document uniquely, but in many situations it will identify a few candidate documents. One solution is to prompt the user to confirm the source of the captured information, but a preferable alternative is to make use of other factors to narrow down the possibilities automatically. Such supplemental information can dramatically reduce the amount of text that needs to be captured and/or increase the reliability and speed with which the location in the electronic counterpart can be identified. This extra material is referred to as "context", and it was discussed briefly in Section 4.2.2. We now consider it in more depth.

13.1. System and Capture Context

Perhaps the most important example of such information is the user's capture history.

It is highly probable that any given capture comes from the same document as the previous one, or from an associated document, especially if the previous capture took place in the last few minutes (Section 6.1.2). Conversely, if the system detects that the font has changed between two captures, it is more likely that they are from different documents.

Also useful are the user's longer-term capture history and reading habits. These can also be used to develop a model of the user's interests and associations.

13.2. User's Real-World Context

Another example of useful context is the user's geographical location. A user in Paris is much more likely to be reading Le Monde than the Seattle Times, for example. The timing, size and geographical distribution of printed versions of the documents can therefore be important, and can to some degree be deduced from the operation of the system.

The time of day may also be relevant, for example in the case of a user who always reads one type of publication on the way to work, and a different one at lunchtime or on the train going home.

13.3. Related Digital Context

The user's recent use of electronic documents, including those searched for or retrieved by more conventional means, can also be a helpful indicator.

In some cases, such as on a corporate network, other factors may be usefully considered:

Which documents have been printed recently?
Which documents have been modified recently on the corporate file server?
Which documents have been emailed recently?

All of these examples might suggest that a user was more likely to be reading a paper version of those documents. In contrast, if the repository in which a document resides can affirm that the document has never been printed or sent anywhere where it might have been printed, then it can be safely eliminated in any searches originating from paper.

13.4. Other Statistics—the Global Context

Section 14 covers the analysis of the data stream resulting from paper-based searches, but it should be noted here that statistics about the popularity of documents with other readers, about the timing of that popularity, and about the parts of documents most frequently captured are all examples of further factors which can be beneficial in the search process. The system brings the possibility of Google-type page-ranking to the world of paper.

See also Section 4.2.2 for some other implications of the use of context for search engines.

14. Data-Stream Analysis

The use of the system generates an exceedingly valuable data-stream as a side effect. This stream is a record of what users are reading and when, and is in many cases a record of what they find particularly valuable in the things they read. Such data has never really been available before for paper documents.

Some ways in which this data can be useful for the system, and for the user of the system, are described in Section 6.1. This section concentrates on its use for others. There are, of course, substantial privacy issues to be considered with any distribution of data about what people are reading, but such issues as preserving the anonymity of data are well known to those of skill in the art.

14.1. Document Tracking

When the system knows which documents any given user is reading, it can also deduce who is reading any given document. This allows the tracking of a document through an organization, to allow analysis, for example, of who is reading it and when, how widely it was distributed, how long that distribution took, and who has seen current versions while others are still working from out-of-date copies.

For published documents that have a wider distribution, the tracking of individual copies is more difficult, but the analysis of the distribution of readership is still possible.

14.2. Read Ranking—Popularity of Documents and Sub-Regions

In situations where users are capturing text or other data that is of particular interest to them, the system can deduce the popularity of certain documents and of particular sub-regions of those documents. This forms a valuable input to the system itself (Section 4.2.2) and an important source of information for authors, publishers and advertisers (Section 7.6, Section 10.5). This data is also useful when integrated in search engines and search indices—for example, to assist in ranking search results for queries coming from rendered documents, and/or to assist in ranking conventional queries typed into a web browser.

14.3. Analysis of Users—Building Profiles

Knowledge of what a user is reading enables the system to create a quite detailed model of the user's interests and activities. This can be useful on an abstract statistical basis—"35% of users who buy this newspaper also read the latest book by that author"—but it can also allow other interactions with the individual user, as discussed below.

14.3.1. Social Networking

One example is connecting one user with others who have related interests: These may be people already known to the user. The system may ask a university professor, "Did you know that your colleague at XYZ University has also just read this paper?" The system may ask a user, "Do you want to be linked up with other people in your neighborhood who are also how reading Jane Eyre?" Such links may be the basis for the automatic formation of book clubs and similar social structures, either in the physical world or online.

14.3.2. Marketing

Section 10.6 has already mentioned the idea of offering products and services to an individual user based on their interactions with the system. Current online booksellers, for example, often make recommendations to a user based on their previous interactions with the bookseller. Such recommendations become much more useful when they are based on interactions with the actual books.

14.4. Marketing Based on Other Aspects of the Data-Stream

We have discussed some of the ways in which the system may influence those publishing documents, those advertising through them, and other sales initiated from paper (Section 10). Some commercial activities may have no direct interaction with the paper documents at all and yet may be influenced by them. For example, the knowledge that people in one community spend more time reading the sports section of the newspaper than they do the financial section might be of interest to somebody setting up a health club.

14.5. Types of Data that May be Captured

In addition to the statistics discussed, such as who is reading which bits of which documents, and when and where, it can be of interest to examine the actual contents of the text captured, regardless of whether or not the document has been located.

In many situations, the user will also not just be capturing some text, but will be causing some action to occur as a result. It might be emailing a reference to the document to an acquaintance, for example. Even in the absence of information about the identity of the user or the recipient of the email, the knowledge that somebody considered the document worth emailing is very useful.

In addition to the various methods discussed for deducing the value of a particular document or piece of text, in some circumstances the user will explicitly indicate the value by assigning it a rating.

Lastly, when a particular set of users are known to form a group, for example when they are known to be employees of a particular company, the aggregated statistics of that group can be used to deduce the importance of a particular document to that group. This applies to groups identified through machine classification techniques such as Bayesian statistics, clustering, k-nearest neighbor (k-NN), singular value decomposition (SVD), etc. based on data about documents, captures, users, etc.

15. Device Features and Functions

In some examples, the capture device may be integrated with a mobile phone in which the phone hardware is not modified to support the system, such as where the text capture can be adequately done through image capture and processed by the phone itself, or handled by a system accessible by the mobile phone by, for example, a wireless network connection or cellular connection, or stored in the phone's memory for future processing. Many modern phones have the ability to download software suitable for implementing some parts of the system. In some examples, the camera built into many mobile phones is used to capture an image of the text. The phone display, which would normally act as a viewfinder for the camera, may overlay on the live camera image information about the quality of the image and its suitability for OCR, which segments of text are being captured, and even a transcription of the text if the OCR can be performed on the phone. The phone display may also provide an interface through which a user may interact with the captured text and invoke associated actions.

Similarly, voice data can be captured by a microphone of the mobile phone. Such voice capture is likely to be suboptimal in many situations, however, for example when there is substantial background noise, and accurate voice recognition is a difficult task at the best of times. The audio facilities may best be used to capture voice annotations.

In some examples, the phone is modified to add dedicated capture facilities, or to provide such functionality in a clip-on adaptor or a separate Bluetooth™-connected peripheral in communication with the phone. Whatever the nature of the capture mechanism, the integration of the system with a modern cell phone has many other advantages. The phone has connectivity with the wider world, which means that queries can be submitted to remote search engines or other parts of the system, and copies of documents may be retrieved for immediate storage or viewing. A phone typically has sufficient processing power for many of the functions of the system to be performed locally, and sufficient storage to capture a reasonable amount of data. The amount of storage can also often be expanded by the user. Phones have reasonably good displays and audio facilities to provide user feedback, and often a vibrate function for tactile feedback. They also have good power supplies.

Perhaps significantly of all, many prospective users are already carrying a mobile phone.

A capture device for use with the system needs little more than a way of capturing text from a rendered version of the document. As described earlier, this capture may be achieved through a variety of methods including taking a photograph of part of the document or typing some words into a keypad. This capture may be achieved using a mobile phone with image and audio capture capabilities or an optical scanner which also records voice annotations.

15.1. Input and Output

Many of the possibly beneficial additional input and output facilities for such a device have been described in Section 12.1. They include buttons, scroll-wheels and touch-pads for input, and displays, indicator lights, audio and tactile transducers for output. Sometimes the device will incorporate many of these, sometimes very few. Sometimes the capture device will be able to communicate with another device that already has them (Section 15.6), for example using a wireless link, and sometimes the capture functionality will be incorporated into such other device (Section 15.7).

15.2. Connectivity

In some examples, the device implements the majority of the system itself. In some examples, however, it often communicates with a PC or other computing device and with the wider world using communications facilities.

Often these communications facilities are in the form of a general-purpose data network such as Ethernet, 802.11 or UWB or a standard peripheral-connecting network such as USB, IEEE-1394 (Firewire), Bluetooth™ or infra-red. When a wired connection such as Firewire or USB is used, the device may receive electrical power though the same connection. In some circumstances, the capture device may appear to a connected machine to be a conventional peripheral such as a USB storage device.

Lastly, the device may in some circumstances "dock" with another device, either to be used in conjunction with that device or for convenient storage.

15.3. Caching and Other Online/Offline Functionality

Sections 3.5 and 12.1.4 have raised the topic of disconnected operation. When a capture device has a limited subset of the total system's functionality, and is not in communication with the other parts of the system, the device can still be useful, though the functionality available will sometimes be reduced. At the simplest level, the device can record the raw image or audio data being captured and this can be processed later. For the user's benefit, however, it can be important to give feedback where possible about whether the data captured is likely to be sufficient for the task in hand, whether it can be recognized or is likely to be recognizable, and whether the source of the data can be identified or is likely to be identifiable later. The user will then know whether their capturing activity is worthwhile. Even when all of the above are unknown, the raw data can still be stored so that, at the very least, the user can refer to them later. The user may be presented with the image of a capture, for example, when the capture cannot be recognized by the OCR process.

To illustrate some of the range of options available, both a rather minimal optical scanning device and then a much more full-featured one are described below. Many devices occupy a middle ground between the two.

15.3.1. The SimpleScanner—a Low-End Offline Example

The SimpleScanner has a scanning head able to read pixels from the page as it is moved along the length of a line of text. It can detect its movement along the page and record the pixels with some information about the movement. It also has a clock, which allows each scan to be time-stamped. The clock is synchronized with a host device when the SimpleScanner has connectivity. The clock may not represent the actual time of day, but relative times may be determined from it so that the host can deduce the actual time of a scan, or at worst the elapsed time between scans.

The SimpleScanner does not have sufficient processing power to perform any OCR itself, but it does have some basic knowledge about typical word-lengths, word-spacings, and their relationship to font size. It has some basic indicator lights which tell the user whether the scan is likely to be readable, whether the head is being moved too fast, too slowly or too inaccurately across the paper, and when it determines that sufficient words of a given size are likely to have been scanned for the document to be identified.

The SimpleScanner has a USB connector and can be plugged into the USB port on a computer, where it will be recharged. To the computer it appears to be a USB storage device on which time-stamped data files have been recorded, and the rest of the system software takes over from this point.

15.3.2. The SuperDevice—a High-End Offline Example

The SuperDevice also depends on connectivity for its full operation, but it has a significant amount of on-board storage and processing which can help it make better judgments about the data captured while offline.

As the SuperDevice captures text by, for example, processing images of a document captured by a camera of the SuperDevice, the captured text is passed to an OCR engine that attempts to recognize the text. A number of fonts, including those from the user's most-read publications, have been downloaded to it to help perform this task, as has a dictionary that is synchronized with the user's spelling-checker dictionary on their PC and so contains many of the words they frequently encounter. Also stored on the SuperDevice is a list of words and phrases with the typical frequency of their use—this may be combined with the dictionary. The SuperDevice can use the frequency statistics both to help with the recognition process and also to inform its judgment about when a sufficient quantity of text has been captured; more frequently used phrases are less likely to be useful as the basis for a search query.

In addition, the full index for the articles in the recent issues of the newspapers and periodicals most commonly read by the user are stored on the SuperDevice, as are the indices for the books the user has recently purchased from an online bookseller, or from which the user has captured anything within the last few months. Lastly, the titles of several thousand of the most popular publications which have data available for the system are stored so that, in the absence of other information the user can capture the title and have a good idea as to whether or not captures from a particular work are likely to be retrievable in electronic form later.

During the capture process, the system informs the user that the captured data has been of sufficient quality and of a sufficient nature to make it probable that the electronic copy of the captured information can be retrieved when connectivity is restored. Often the system indicates to the user that the capture is known to have been successful and that the context has been recognized in one of the on-board indices, or that the publication concerned is known to be making its data available to the system, so the later retrieval ought to be successful.

The SuperDevice docks in a cradle connected to a PC's Firewire or USB port, at which point, in addition to the upload of captured data, its various onboard indices and other databases are updated based on recent user activity and new publications. The SuperDevice also has the facility to connect to wireless public networks, to cellular networks, or to communicate via Bluetooth™ to a mobile phone and thence with the public network when such facilities are available. In some cases, the onboard indices and other databases may be updated wirelessly. The update process may be initiated by the user or automatically by the system.

15.4. Features for Image Capture

We now consider some of the features that may be particularly desirable in a capture device.

15.4.1. Flexible Positioning and Convenient Optics

One of the reasons for the continuing popularity of paper is the ease of its use in a wide variety of situations where a computer, for example, would be impractical or inconvenient. A device intended to capture a substantial part of a user's interaction with paper should therefore be similarly convenient in use. This has not been the case for scanners in the past; even the smallest hand-held devices have been somewhat unwieldy. Those designed to be in contact with the page have to be held at a precise angle to the paper and moved very carefully along the length of the text to be scanned. This is acceptable when scanning a business report on an office desk, but may be impractical when scanning a phrase from a novel while waiting for a train. Camera-based capture devices that operate at a distance from the paper may similarly be useful in many circumstances.

Some examples of the system use a scanner that scans in contact with the paper, and which, instead of lenses, uses an image conduit a bundle of optical fibers to transmit the image from the page to the optical sensor device. Such a device can be shaped to allow it to be held in a natural position; for example, in some examples, the part in contact with the page is wedge-shaped, allowing the user's hand to move more naturally over the page in a movement similar to the use of a highlighter pen. The conduit is either in direct contact with the paper or in close proximity to it, and may have a replaceable transparent tip that can protect the image conduit from possible damage. As has been mentioned in Section 12.2.4, the scanner may be used to scan from a screen as well as from paper, and the material of the tip can be chosen to reduce the likelihood of damage to such displays.

Lastly, some examples of the device will provide feedback to the user during the capture process which will indicate through the use of light, sound or tactile feedback when the user is moving the capture device too fast, too slow, too unevenly or is drifting too high or low on the capture line.

15.5. Security, Identity, Authentication, Personalization and Billing

As described in Section 6, the capture device may form an important part of identification and authorization for secure transactions, purchases, and a variety of other operations. It may therefore incorporate, in addition to the circuitry and software required for such a role, various hardware features that can make it more secure, such as a smartcard reader, RFID, or a keypad on which to type a PIN.

It may also include various biometric sensors to help identify the user. In the case of a capture device with image capturing capabilities, for example, the camera may also be able to read a fingerprint. For a voice recorder, the voice pattern of the user may be used.

15.6. Device Associations

In some examples, the capture device is able to form an association with other nearby devices to increase either its own or their functionality. In some examples, for example, it uses the display of a nearby PC or phone to give supplemental feedback about its operation, or uses their network connectivity. The device may, on the other hand, operate in its role as a security and identification device to authenticate operations performed by the other device. Or it may simply form an association in order to function as a peripheral to that device.

An interesting aspect of such associations is that they may be initiated and authenticated using the capture facilities of the device. For example, a user wishing to identify themselves securely to a public computer terminal may use the capture facilities of the device to capture a code or symbol displayed on a particular area of the terminal's screen and so effect a key transfer. An analogous process may be performed using audio signals picked up by a voice-recording device.

15.7. Integration with Other Devices

In some examples, the functionality of the capture device is integrated into some other device that is already in use. The integrated devices may be able to share a power supply, data capture and storage capabilities, and network interfaces. Such integration may be done simply for convenience, to reduce cost, or to enable functionality that would not otherwise be available.

Some examples of devices into which the capture functionality can be integrated include:
- an existing peripheral such as a mouse, a stylus, a USB "webcam" camera, a Bluetooth™ headset or a remote control;
- another processing/storage device, such as a PDA, an MP3 player, a voice recorder, or a digital camera;
- other often-carried or often-worn items, just for convenience—a watch, a piece of jewelry, glasses, a hat, a pen, a car key fob; and so on Part III—Example Applications of the System This section lists example uses of the system and applications that may be built on it. This list is intended to be purely illustrative and in no sense exhaustive.

16. Personal Applications 16.1. Life Library

The Life Library (see also Section 6.1.1) is a digital archive of any important documents that the subscriber wishes to save and is a set of examples of services of this system. Important books, magazine articles, newspaper clippings, etc., can all be saved in digital form in the Life Library. Additionally, the subscriber's annotations, comments, and notes can be saved with the documents. The Life Library can be accessed via the Internet and World Wide Web.

The system creates and manages the Life Library document archive for subscribers. The subscriber indicates which documents the subscriber wishes to have saved in his Life Library by capturing information from the document or by otherwise indicating to the system that the particular document is to be added to the subscriber's Life Library. The captured information is typically text from the document but can also be a barcode or other code identifying the document. The system accepts the code and uses it to identify the source document. After the document is identified the system can store either a copy of the document in the user's Life Library or a link to a source where the document may be obtained.

One example of the Life Library system can check whether the subscriber is authorized to obtain the electronic copy. For example, if a reader captures text or an identifier from a copy of an article in the New York Times (NYT) so that the article will be added to the reader's Life Library, the Life Library system will verify with the NYT whether the reader is subscribed to the online version of the NYT; if so, the reader gets a copy of the article stored in his Life Library account; if not, information identifying the document and how to order it is stored in his Life Library account.

In some examples, the system maintains a subscriber profile for each subscriber that includes access privilege information. Document access information can be compiled in several ways, two of which are: 1) the subscriber supplies the document access information to the Life Library system, along with his account names and passwords, etc., or 2) the Life Library service provider queries the publisher with the subscriber's information and the publisher responds by providing access to an electronic copy if the Life Library subscriber is authorized to access the material. If the Life Library subscriber is not authorized to have an electronic copy of the document, the publisher provides a price to the Life Library service provider, which then provides the customer with the option to purchase the electronic document. If so, the Life Library service provider either pays the publisher directly and bills the Life Library customer later or the Life Library service provider immediately bills the customer's credit card for the purchase. The Life Library service provider would get a percentage of the purchase price or a small fixed fee for facilitating the transaction.

The system can archive the document in the subscriber's personal library and/or any other library to which the subscriber has archival privileges. For example, as a user captures text from a printed document, the Life Library system can identify the rendered document and its electronic counterpart. After the source document is identified, the Life Library system might record information about the source document in the user's personal library and in a group library to which the subscriber has archival privileges. Group libraries are collaborative archives such as a document repository for: a group working together on a project, a group of academic researchers, a group web log, etc.

The Life Library can be organized in many ways: chronologically, by topic, by level of the subscriber's interest, by type of publication (newspaper, book, magazine, technical paper, etc.), where read, when read, by ISBN or by Dewey decimal, etc. In one alternative, the system can learn classifications based on how other subscribers have classified the same document. The system can suggest classifications to the user or automatically classify the document for the user.

In various examples, annotations may be inserted directly into the document or may be maintained in a separate file. For example, when a subscriber captures text from a newspaper article, the article is archived in his Life Library with the captured text highlighted. Alternatively, the article is archived in his Life Library along with an associated annotation file (thus leaving the archived document unmodified). Examples of the system can keep a copy of the source document in each subscriber's library, a copy in a master library that many subscribers can access, or link to a copy held by the publisher.

In some examples, the Life Library stores only the user's modifications to the document (e.g., highlights, etc.) and a link to an online version of the document (stored elsewhere). The system or the subscriber merges the changes with the document when the subscriber subsequently retrieves the document.

If the annotations are kept in a separate file, the source document and the annotation file are provided to the subscriber and the subscriber combines them to create a modified document. Alternatively, the system combines the two files prior to presenting them to the subscriber. In another alternative, the annotation file is an overlay to the document file and can be overlaid on the document by software in the subscriber's computer.

Subscribers to the Life Library service pay a monthly fee to have the system maintain the subscriber's archive. Alternatively, the subscriber pays a small amount (e.g., a micropayment) for each document stored in the archive. Alternatively, the subscriber pays to access the subscriber's archive on a per-access fee. Alternatively, subscribers can compile libraries and allow others to access the materials/annotations on a revenue share model with the Life Library service provider and copyright holders. Alternatively, the Life Library service provider receives a payment from the publisher when the Life Library subscriber orders a document (a revenue share model with the publisher, where the Life Library service provider gets a share of the publisher's revenue).

In some examples, the Life Library service provider acts as an intermediary between the subscriber and the copyright holder (or copyright holder's agent, such as the Copyright Clearance Center, a.k.a. CCC) to facilitate billing and payment for copyrighted materials. The Life Library service provider uses the subscriber's billing information and other user account information to provide this intermediation service. Essentially, the Life Library service provider leverages the pre-existing relationship with the subscriber to enable purchase of copyrighted materials on behalf of the subscriber.

In some examples, the Life Library system can store excerpts from documents. For example, when a subscriber captures text from a paper document, the regions around the captured text are excerpted and placed in the Life Library, rather than the entire document being archived in the Life Library. This is especially advantageous when the document is long because preserving the circumstances of the original capture prevents the subscriber from re-reading the document to find the interesting portions. Of course, a hyperlink to the entire electronic counterpart of the paper document can be included with the excerpt materials.

In some examples, the system also stores information about the document in the Life Library, such as author, publication title, publication date, publisher, copyright holder (or copyright holder's licensing agent), ISBN, links to public annotations of the document, readrank, etc. Some of this additional information about the document is a form of paper document metadata. Third parties may create public annotation files for access by persons other than themselves, such the general public. Linking to a third party's commentary on a document is advantageous because reading annotation files of other users enhances the subscriber's understanding of the document.

In some examples, the system archives materials by class. This feature allows a Life Library subscriber to quickly store electronic counterparts to an entire class of paper documents without access to each paper document. For example, when the subscriber captures some text from a copy of National Geographic magazine, the system provides the subscriber with the option to archive all back issues of the National Geographic. If the subscriber elects to archive all back issues, the Life Library service provider would then verify with the National Geographic Society whether the subscriber is authorized to do so. If not, the Life Library service provider can mediate the purchase of the right to archive the National Geographic magazine collection.

16.2. Life Saver

A variation on, or enhancement of, the Life Library concept is the "Life Saver", where the system uses the text captured by a user to deduce more about their other activities. The capture of a menu from a particular restaurant, a program from a particular theater performance, a timetable at a particular railway station, or an article from a local newspaper allows the system to make deductions about the user's location and social activities, and could construct an automatic diary for them, for example as a website. The user would be able to edit and modify the diary, add additional materials such as photographs and, of course, look again at the items captured.

17. Academic Applications

Capture device supported by the described system have many compelling uses in the academic setting. They can enhance student/teacher interaction and augment the learning experience. Among other uses, students can annotate study materials to suit their unique needs; teachers can monitor classroom performance; and teachers can automatically verify source materials cited in student assignments.

17.1. Children's Books

A child's interaction with a paper document, such as a book, is monitored by a literacy acquisition system that employs a specific set of examples of this system. The child uses a capture device that communicates with other elements of the literacy acquisition system. In addition to the capture device, the literacy acquisition system includes a display and speakers, and a database accessible by the capture device. When the child sees an unknown word in the book, the child captures it with the capture device. In one example, the literacy acquisition system compares the captured text with the resources in its database to identify the word. The database includes a dictionary, thesaurus, and/or multimedia files (e.g., sound, graphics, etc.). After the word has been identified, the system uses the speakers to pronounce the word and its definition to the child. In another example, the word and its definition are displayed by the literacy acquisition system on the display. Multimedia files about the captured word can also be played through the display and speakers. For example, if a child reading "Goldilocks and the Three Bears" captured the word "bear", the system might pronounce the word "bear" and play a short video about bears on the display. In this way, the child learns to pronounce the written word and is visually taught what the word means via the multimedia presentation.

The literacy acquisition system provides immediate auditory and/or visual information to enhance the learning process. The child uses this supplementary information to quickly acquire a deeper understanding of the written material. The system can be used to teach beginning readers to read, to help children acquire a larger vocabulary, etc. This system provides the child with information about words with which the child is unfamiliar or about which the child wants more information.

17.2. Literacy Acquisition

In some examples, the system compiles personal dictionaries. If the reader sees a word that is new, interesting, or particularly useful or troublesome, the reader saves it (along with its definition) to a computer file. This computer file becomes the reader's personalized dictionary. This dictionary is generally smaller in size than a general dictionary so can be downloaded to a mobile station or associated device and thus be available even when the system isn't immediately accessible. In some examples, the personal dictionary entries include audio files to assist with proper word pronunciation and information identifying the paper document from which the word was captured.

In some examples, the system creates customized spelling and vocabulary tests for students. For example, as a student reads an assignment, the student may capture unfamiliar words with the capture device. The system stores a list of all the words that the student has captured. Later, the system administers a customized spelling/vocabulary test to the student on an associated monitor (or prints such a test on an associated printer).

17.3. Music Teaching

The arrangement of notes on a musical staff is similar to the arrangement of letters in a line of text. The capture device can be used to capture music notation, and an analogous process of constructing a search against databases of known musical pieces would allow the piece from which the capture occurred to be identified which can then be retrieved, played, or be the basis for some further action.

17.4. Detecting Plagiarism

Teachers can use the system to detect plagiarism or to verify sources by capturing text from student papers and submitting captured text to the system. For example, a teacher who wishes to verify that a quote in a student paper came from the source that the student cited can capture a portion of the quote and compare the title of the document identified by the system with the title of the document cited by the student. Likewise, the system can use captures of text from assignments submitted as the student's original work to reveal if the text was instead copied.

17.5. Enhanced Textbook

In some examples, capturing text from an academic textbook links students or staff to more detailed explanations, further exercises, student and staff discussions about the material, related example past exam questions, further reading on the subject, recordings of the lectures on the subject, and so forth. (See also Section 7.1).

17.6. Language Learning

In some examples, the system is used to teach foreign languages. Capturing a Spanish word, for example, might cause the word to be read aloud in Spanish along with its definition in English.

The system provides immediate auditory and/or visual information to enhance the new language acquisition process. The reader uses this supplementary information to acquire quickly a deeper understanding of the material. The system can be used to teach beginning students to read foreign languages, to help students acquire a larger vocabulary, etc. The system provides information about foreign words with which the reader is unfamiliar or for which the reader wants more information. When capturing text in one language, the capture device may display the captured text in another language more familiar to the user. As another example, the capture device may display the captured text as it appears in the document but allow the user to selectively translate and display certain words unfamiliar or unknown to the user, for example, by tapping on the words on a touch-screen of the capture device. The translation may be performed by the capture device or sent to another system for translation.

Reader interaction with a paper document, such as a newspaper or book, is monitored by a language skills system. The reader has a capture device that communicates with the language skills system. In some examples, the language skills system includes a display and speakers, and a database accessible by the capture device. When the reader sees an unknown word in an article, the reader captures it with the capture device. The database includes a foreign language dictionary, thesaurus, and/or multimedia files (sound, graphics, etc.). In one example, the system compares the captured text with the resources in its database to identify the captured word. After the word has been identified, the system uses the speakers to pronounce the word and its definition to the reader. In some examples, the word and its definition are both displayed on the display. Multimedia files about grammar tips related to the captured word can also be played through the display and speakers. For example, if the words "to speak" are captured, the system might pronounce the word "hablar," play a short audio clip that demonstrates the proper Spanish pronunciation, and display a complete list of the various conjugations of "hablar". In this way, the student learns to pronounce the written word, is visually taught the spelling of the word via the multimedia presentation, and learns how to conjugate the verb. The system can also present grammar tips about the proper usage of "hablar" along with common phrases.

In some examples, the user captures a word or short phrase from a rendered document in a language other than the user's native language (or some other language that the user knows reasonably well). In some examples, the system maintains a prioritized list of the user's "preferred" languages. The system identifies the electronic counterpart of the rendered document, and determines the location of the capture within the document. The system also identifies a second electronic counterpart of the document that has been translated into one of the user's preferred languages, and determines the location in the translated document corresponding to the location of the capture in the original document. When the corresponding location is not known precisely, the system identifies a small region (e.g., a paragraph) that includes the corresponding location of the captured location. The corresponding translated location is then presented to the user. This provides the user with a precise translation of the particular usage at the captured location, including any slang or other idiomatic usage that is often difficult to accurately translate on a word-by-word basis.

17.7. Gathering Research Materials

A user researching a particular topic may encounter all sorts of material, both in print and on screen, which they might wish to record as relevant to the topic in some personal archive. The system would enable this process to be automatic as a result of capturing a short phrase in any piece of material, and could also create a bibliography suitable for insertion into a publication on the subject.

18. Commercial Applications

Obviously, commercial activities could be made out of almost any process discussed in this document, but here we concentrate on a few obvious revenue streams.

18.1. Fee-Based Searching and Indexing

Conventional Internet search engines typically provide free search of electronic documents, and also make no charge to the content providers for including their content in the index. In some examples, the system provides for charges to users and/or payments to search engines and/or content providers in connection with the operation and use of the system.

In some examples, subscribers to the system's services pay a fee for searches originating from captures of paper documents. For example, a stockbroker may be reading a Wall Street Journal article about a new product offered by Company X. By capturing the Company X name from the paper document and agreeing to pay the necessary fees, the stockbroker uses the system to search special or proprietary databases to obtain premium information about the company, such as analyst's reports. The system can also make arrangements to have priority indexing of the documents most likely to be read in paper form, for example by making sure all of the newspapers published on a particular day are indexed and available by the time they hit the streets.

Content providers may pay a fee to be associated with certain terms in search queries submitted from paper documents. For example, in one example, the system chooses a most preferred content provider based on additional context about the provider (the context being, in this case, that the content provider has paid a fee to be moved up the results list). In essence, the search provider is adjusting paper document search results based on pre-existing financial arrangements with a content provider. See also the description of keywords and key phrases in Section 5.2.

Where access to particular content is to be restricted to certain groups of people (such as clients or employees), such content may be protected by a firewall and thus not generally indexable by third parties. The content provider may nonetheless wish to provide an index to the protected content. In such a case, the content provider can pay a service provider to provide the content provider's index to system subscribers. For example, a law firm may index all of a client's documents. The documents are stored behind the law firm's firewall. However, the law firm wants its employees and the client to have access to the documents through the captured device so it provides the index (or a pointer to the index) to the service provider, which in turn searches the law firm's index when employees or clients of the law firm submit search terms captured by a capture device. The law firm can provide a list of employees and/or clients to the service provider's system to enable this function or the system can verify access rights by querying the law firm prior to searching the law firm's index. Note that in the preceding example, the index provided by the law firm is only of that client's documents, not an index of all documents at the law firm. Thus, the service provider can only grant the law firm's clients access to the documents that the law firm indexed for the client.

There are at least two separate revenue streams that can result from searches originating from paper documents: one revenue stream from the search function, and another from the content delivery function. The search function revenue can be generated from paid subscriptions from users, but can also be generated on a per-search charge. The content delivery revenue can be shared with the content provider or copyright holder (the service provider can take a percentage of the sale or a fixed fee, such as a micropayment, for each delivery), but also can be generated by a "referral" model in which the system gets a fee or percentage for every item that the subscriber orders from the online catalog and that the system has delivered or contributed to, regardless of whether the service provider intermediates the transaction. In some examples, the system service provider receives revenue for all purchases that the subscriber made from the content provider, either for some predetermined period of time or at any subsequent time when a purchase of an identified product is made.

18.2. Catalogs

Consumers may use the capture device to make purchases from paper catalogs. The subscriber captures information from the catalog that identifies the catalog. This information is text from the catalog, a bar code, or another identifier of the catalog. The subscriber captures information identifying the products that s/he wishes to purchase. The catalog mailing label may contain a customer identification number that identifies the customer to the catalog vendor. If so, the subscriber can also capture this customer identification number. The system acts as an intermediary between the subscriber and the vendor to facilitate the catalog purchase by providing the customer's selection and customer identification number to the vendor.

18.3. Coupons

A consumer captures paper coupons and saves an electronic copy of the coupon in the capture device, or in a remote device such as a computer, for later retrieval and use. An advantage of electronic storage is that the consumer is freed from the burden of carrying paper coupons. A further advantage is that the electronic coupons may be retrieved from any location. In some examples, the system can track coupon expiration dates, alert the consumer about coupons that will expire soon, and/or delete expired coupons from storage. An advantage for the issuer of the coupons is the possibility of receiving more feedback about who is using the coupons and when and where they are captured and used.

18.3. Advertising Portal

An advertising portal may allow advertisers to create and manage markup layers associated with various advertisements. In one example, an advertisement portal may provide a web interface by which an advertiser can register one or more advertisement campaigns and associated information, such as a name, markup information associated with the campaign, information about when advertisements in the campaign should be displayed and to whom the advertisements should be display, information about the advertised products or services, and/or advertised products, tags, keywords, and/or key phrases associated with the advertisement campaign, text or other media associated with the advertisements, and so on. An advertising portal may also provide an interface by which an advertiser can indicate controls that should appear in the associated markup layer. For example, an advertiser may indicate a particular region within an advertising image and/or a particular phrase or word within advertising text that should be displayed with a control overlay when the advertisement is captured and displayed on a captured device. In some examples, an advertising portal may also allow advertisers to provide a fulfillment specification, which may include one or more preferred vendors and/or a "how to purchase" process. An advertising portal may also provide an interface by which an advertiser may control aspects of a customer's experience, including whether and/or when to offer special deals, various types of media, a markup layer tailored to a particular user's interests, needs, geographic location, spoken language, and so on. For example, an advertising portal may provide a translation of an advertisement from the advertisement's language into a language preferred by a user of the capture device capturing the advertisement. In some examples, an advertising portal may provide services that may be utilized by consumers. For example, an advertising portal may allow consumers or other third parties to post reviews and/or commentary related to advertisement interactivity layers, vendors, advertisers, products, services, and the like. In other examples, an advertising portal may enable users to post commentary related to rendered or printed advertisements, including links, images, cross-references, etc.

19. General Applications 19.1. Forms

The system may be used to auto-populate an electronic document that corresponds to a paper form. A user captures in some text or a barcode that uniquely identifies the paper form. The capture device communicates the identity of the form and information identifying the user to a nearby computer. The nearby computer has an Internet connection. The nearby computer can access a first database of forms and a second database having information about the user of the capture device (such as a service provider's subscriber information database). The nearby computer accesses an electronic version of the paper form from the first database and auto-populates the fields of the form from the user's information obtained from the second database. The nearby computer then emails the completed form to the intended recipient. Alternatively, the computer could print the completed form on a nearby printer.

Rather than access an external database, in some examples, the system has a capture device that contains the user's information, such as in an identity module, SIM, or security card. The capture device provides information identifying the form to the nearby PC. The nearby PC accesses the electronic form and queries the capture device for any necessary information to fill out the form.

19.2. Business Cards

The system can be used to automatically populate electronic address books or other contact lists from paper documents. For example, upon receiving a new acquaintance's business card, a user can capture an image of the card with his/her cellular phone. The system will locate an electronic copy of the card, which can be used to update the cellular phone's onboard address book with the new acquaintance's contact information. The electronic copy may contain more information about the new acquaintance than can be squeezed onto a business card. Further, the onboard address book may also store a link to the electronic copy such that any changes to the electronic copy will be automatically updated in the cell phone's address book. In this example, the business card optionally includes a symbol or text that indicates the existence of an electronic copy. If no electronic copy exists, the cellular phone can use OCR and knowledge of standard business card formats to fill out an entry in the address book for the new acquaintance. Symbols may also aid in the process of extracting information directly from the image. For example, a phone icon next to the phone number on the business card can be recognized to determine the location of the phone number.

19.3. Proofreading/Editing

The system can enhance the proofreading and editing process. One way the system can enhance the editing process is by linking the editor's interactions with a paper document to its electronic counterpart. As an editor reads a paper document and captures various parts of the document, the system will make the appropriate annotations or edits to an electronic counterpart of the paper document. For example, if the editor captures a portion of text and makes the "new paragraph" control gesture with the capture device, a computer in communication with the capture device would insert a "new paragraph" break at the location of the captured text in the electronic copy of the document.

19.4. Voice Annotation

A user can make voice annotations to a document by capturing a portion of text from the document and then making a voice recording that is associated with the captured text. In some examples, the capture device has a microphone to record the user's verbal annotations. After the verbal annotations are recorded, the system identifies the document from which the text was captured, locates the captured text within the document, and attaches the voice annotation at that point. In some examples, the system converts the speech to text and attaches the annotation as a textual comment.

In some examples, the system keeps annotations separate from the document, with only a reference to the annotation kept with the document. The annotations then become an annotation markup layer to the document for a specific subscriber or group of users.

In some examples, for each capture and associated annotation, the system identifies the document, opens it using a software package, scrolls to the location of the capture and plays the voice annotation. The user can then interact with a document while referring to voice annotations, suggested changes or other comments recorded either by themselves or by somebody else.

19.5. Help in Text

The described system can be used to enhance paper documents with electronic help menus. In some examples, a markup layer associated with a paper document contains help menu information for the document. For example, when a user captures text from a certain portion of the document, the system checks the markup associated with the document and presents a help menu to the user, such as on a display of the capture device.

19.6. Use with Displays

In some situations, it is advantageous to be able to capture information from a television, computer monitor, or other similar display. In some examples, the capture device is used to capture information from computer monitors and televisions. In some examples, the capture device has an illumination sensor that is optimized to work with traditional cathode ray tube (CRT) display techniques such as rasterizing, screen blanking, etc.

A voice capture device which operates by capturing audio of the user reading text from a document will typically work regardless of whether that document is on paper, on a display, or on some other medium.

19.6.1. Public Kiosks and Dynamic Session IDs

One use of the direct capture of displays is the association of devices as described in Section 15.6. For example, in some examples, a public kiosk displays a dynamic session ID on its monitor. The kiosk is connected to a communication network such as the Internet or a corporate intranet. The session ID changes periodically but at least every time that the kiosk is used so that a new session ID is displayed to every user. To use the kiosk, the subscriber captures the session ID displayed on the kiosk; by capturing the session ID, the user tells the system that he wishes to temporarily associate the kiosk with his capture device for the delivery of content resulting from captures of printed documents or from the kiosk screen itself. The capture device may communicate the Session ID and other information authenticating the capture device (such as a serial number, account number, or other identifying information) directly to the system. For example, the capture device can communicate directly (where "directly" means without passing the message through the kiosk) with the system by sending the session initiation message via a cellular network accessible by, the capture device. Alternatively, the capture device can establish a wireless link with the kiosk and use the kiosk's communication link by transferring the session initiation information to the kiosk (perhaps via short range RF such as Bluetooth™, etc.); in response, the kiosk sends the session initiation information to the system via its Internet connection.

The system can prevent others from using a device that is already associated with a capture device during the period (or session) in which the device is associated with the capture device. This feature is useful to prevent others from using a public kiosk before another person's session has ended. As an example of this concept related to use of a computer at an Internet café, the user captures a barcode on a monitor of a PC which s/he desires to use; in response, the system sends a session ID to the monitor that it displays; the user initiates the session by capturing the session ID from the monitor (or entering it via a keypad or touch screen or microphone on the capture device); and the system associates in its databases the session ID with the serial number (or other identifier that uniquely identifies the user's capture device) of his/her capture device so another capture device cannot capture the session ID and use the monitor during his/her session. The capture device is in communication (through wireless link such as Bluetooth™, a hardwired link such as a docking station, etc.) with a PC associated with the monitor or is in direct (i.e., w/o going through the PC) communication with the system via another means such as a cellular phone, etc.

19.7. Social Networking or Collaboration Environment

The system may provide a social networking or collaboration environment, such as a wiki and sometimes referred to as a "wiqi," where users can create pages for words, phrases, sentences, etc. where users can post relevant information. For example, a user may create a page for a famous quotes from a books or movie where users may post images, audio, video, etc. of the quote being used or an index containing information about where the quote has been used or cited. In some examples, the system may automatically update these pages when a user captures the relevant text via a capture device. As another example, the capture device may overlay a captured image with links to a wiqi page corresponding to captured text. A wiqi page for a particular word or phrase may be available to all users or may be created for a select group of users, such as a family or a group of friends. Thus, in some examples, the system facilitates the use of rendered documents as platforms into a digital environment of collaborative information exchange, among other benefits.

19.8. Concierge Service

A software concierge system or service provides a human assistant (e.g., a virtual concierge) that receives information about problems a user faces while using an application and can take action to offer solutions or correct the problems. The human assistant can correct problems that are difficult for automated processes to correct, and can provide feedback to the application author about areas of friction when using the software. For example, a user searching for a document may have difficulty finding the document, but the human assistant may examine the keywords the user is using to search, have an idea of what the user is trying to find, and inject better keywords into the user's search query so that the user receives more relevant search results. As another example, if the system is unable to identify or recognize text within a captured image or identify a corresponding electronic version of a rendered document, these tasks may be sent to a software concierge system for assistance. Furthermore, a user may use the concierge system to order items identified by the capture device. This saves the user time and increases the user's satisfaction with and overall opinion of the application. Thus, the software concierge system provides a new layer of software performance that improves user experiences and enables ways to use software that software developers were previously unable to implement.

Part IV—System Details

Detecting Proximity to/Presence of Information to be Captured

As discussed herein, the system may cause a capture device, such as capture device 300, to alter, change, or modify its operation when in the presence of information capable of being captured by the device and/or within a certain proximity to information capable of being captured by the device. In some examples, the system operates a capture device 300 in an information aware mode, periodically or continuously looking or attempting to find or detect information. When information is found or detected, the system causes operation of a capture device to change to a capture mode operation.

Figure 4:
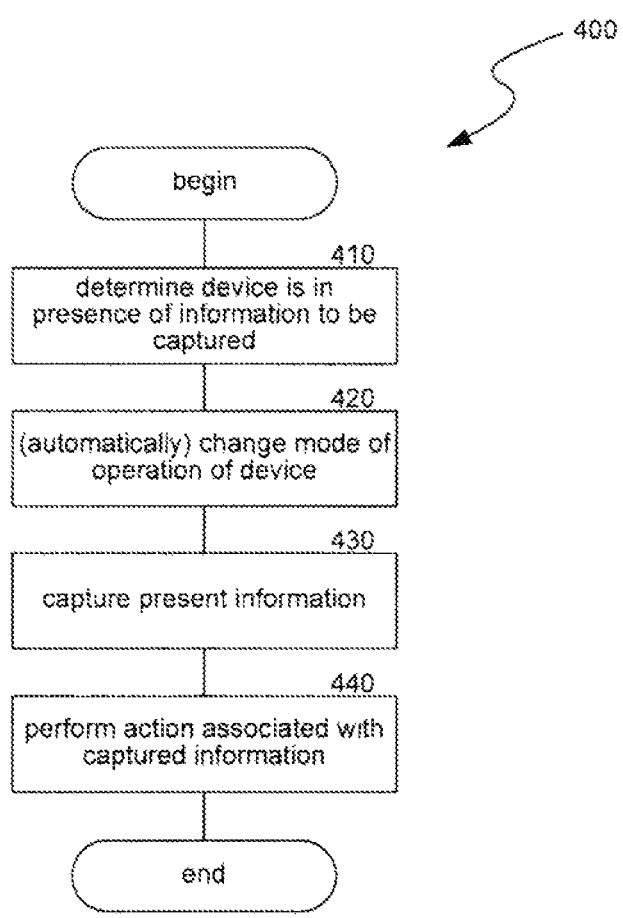
FIG. 4 is a flow diagram illustrating a routine for identifying when a capture device is in proximity to or in the presence of information to be captured.

FIG. 4 is a flow diagram illustrating a routine 400 for identifying when a capture device is in proximity to or in the presence of information to be captured. In step 410, the system determines the capture device 300 is in the presence of information to be captured. The system may utilize the detection component 330 to determine the device is proximate to information. In some cases, the detection component 330 may facilitate detecting the presence of information via an imaging or other capture component 310 of the capture device. In some cases, the detection component 330 may facilitate detecting the presence of information via components that measure distances between the capture device and target objects (such as rendered documents, displays of information, and so on) and determine that the capture device is within a certain proximity to a target object associated with a user intention to capture information from or about that target object. In some cases, the detection component may facilitate detecting the presence of information via components that measure the orientation of the device relative to a target object and determine that the capture device is in a certain position or orientation, possibly for a certain duration of time, associated with a user intention to capture information from or about that target object. Further details and aspects regarding determining that a capture device is in the presence of information are described herein with respect to FIGS. 6A-6C.

In step 420, the system automatically changes the mode of the operation of the capture device 300 in response to the determination of step 410 that the device is in the presence of information to be captured by the device. In some cases, the system changes, alters, or modifies a current mode of operation of the mobile device 300. For example, the capture device may currently be in a default mode (no applications or features running, displaying the home screen to a user), and, upon detecting the device is proximate to information to be captured (such as a rendered document), the system automatically changes or transitions the mode of operation to the document capture mode described herein. In some cases, the system does not change the mode of operation and instead launches an application (or modifies current functionality of a running application) within a current mode of operation, wherein the launched application enables the capture device 300 to capture the proximate information. For example, the capture device 300 is running an music application that plays music for a user, and upon detecting the device is proximate to information (such as poster advertising a rock band's new album), the system automatically changes the current screen of the running application (such as a screen that can subsequently present review information and options to listen to, download, or purchase songs from the advertised album).

In step 430, the system captures the present information. As described herein, the system may perform an optical capture of the information (i.e., take an image of the information using), may perform an audio capture of the information (i.e., record the information being read aloud), or may perform other techniques to capture the information, utilizing other components (i.e., components that read an RFID tag, bar code, or other non-repeating dot pattern, capture geo-location or environmental information, or time/date information; and so on).

In step 440, the system performs an action associated with the captured information. As described herein, the system may perform a number of actions associated with the captured information, including presenting content associated with the captured information, identifying documents associated with the captured information, ordering and purchasing products associated with the captured information, and so on. In some cases, the system performs the action via display components 320 of the capture device 300. In some cases, the system performs the action via components remote from the capture device 300, such as an associated computing device, an associated mobile device, associated media presentation devices (e.g., stereos, mp3 players, televisions, displays, projectors), and so on.

In some examples, the system, after capturing information proximate to the capture device 300, does not perform an action at the time of capture, and instead stores information associated with the capture for later use by a user of the capture device. The system may determine, based on certain input received from a user by the capture device 300 (or from a lack of input received from the user) that the user desires to capture the information for later use. The system may then store information about the capture, such as an indication of the capture, in a database associated with the user or the capture device 300. In some cases, the system may build a timeline of captured information for a user or a capture device, enabling the user to recall and interact with the information and content they witnessed during a day, among other benefits. Further details regarding the storing of the information and the building of timelines are discussed herein.

In some examples, the system may change operation of a device or launch an application only after the system determines that information is within proximity to a device (step 410) and the system determines that the proximate information is associated with electronic or additional content (step 430). That is, the system may require routine 400 to perform steps 410 and 430 before performing step 420 and, later, step 440. When determining that proximate information is associated with digital or additional content, the system first attempts to verify interactive physical information is present, before proceeding to step 420 and changing operation of the device. This may prevent the system, in some cases, from changing operational modes of a capture device when information proximate to the capture device is not associated with additional or alternative information, supplemental content, or performable actions, among other benefits.

Thus, the system enables a user of a capture device to automatically capture information that may be of interest to the user, among other benefits. In some cases, the system anticipates a user intention to capture information, modifying the operation of the user's device to an information capture mode, which may ease the effort involved in quickly and effectively capturing. That is, the system stages or readies a mobile device, such as a mobile phone that provides many different functions (e.g., voice communications, messaging, music playback, taking pictures, text captures, and so on), to capture information when information is available to be captured, among other benefits.

Document Awareness of a Capture Device

Although people interact with a variety of information sources, one large subset of these sources is rendered documents, such as printed documents, documents provided by a presentation layer of a computing device, a television, a radio, a media player, and so on. People consume an enormous amount of information by reading text from rendered documents such as books, magazines, newspapers, billboards, maps, signs, displayed web pages and blogs, movies, videos, TV shows, radio programs, receipts, bills, mail, chalkboards, whiteboards, presentations, and so on. The system, therefore, facilitates the detection of available information, such as text on a rendered document, in proximity to a capture device.

Figure 5:
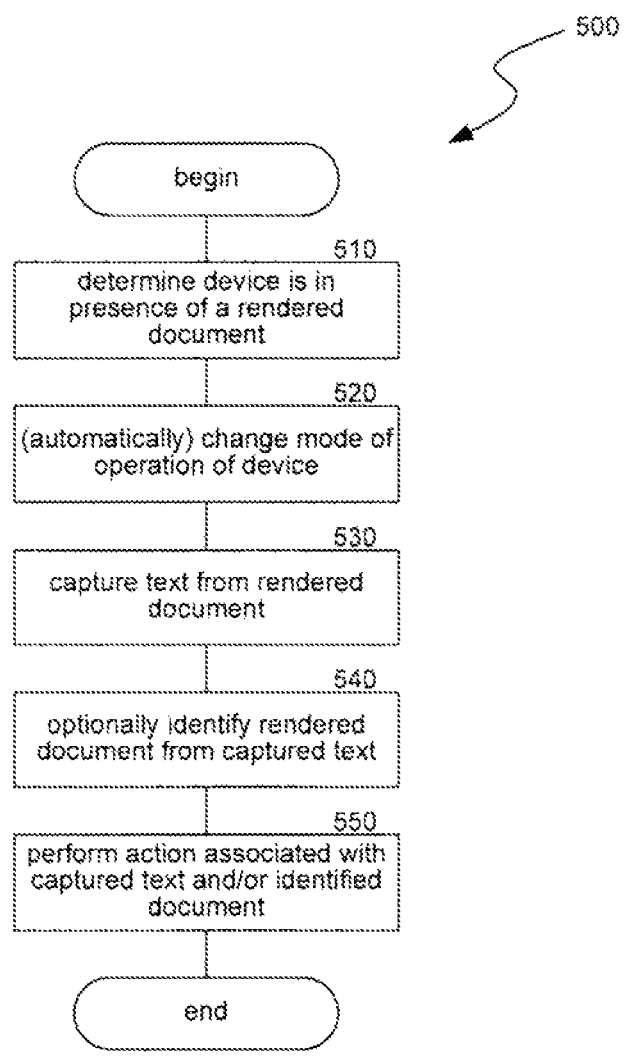
FIG. 5 is a flow diagram illustrating a routine for performing a capture of text from a rendered document using a document aware capture device.

Referring to FIG. 5, a flow diagram illustrating a routine 500 for performing a capture of text from a rendered document using a document aware capture device is shown. In step 510, the system determines a capture device is in the presence of or proximate to a rendered document. In some cases, the system may detect a paper, printed, or painted document, a displayed document, an object having text printed or displayed on an outer surface (e.g., a real estate sign, a product for purchase, and so on), or other objects that present text visible to a user. The system may detect the presence of information using some or all of the detection components described herein.

As discussed with respect to step 410, the system may utilize the detection component 330 to determine the device is proximate to information. In some cases, the detection component 330 may facilitate detecting the presence of text or a rendered document via an imaging or other capture component 310 of the capture device. In some cases, the detection component 330 may facilitate detecting the presence of text or a rendered document via components that measure distances between the capture device and target objects (such as rendered documents, displays of information, and so on) and determine the capture device is within a certain proximity to a target object associated with a user intention to capture the text from or about that target object. In some cases, the detection component may facilitate detecting the presence of text or a rendered document via components that measure the orientation of the device relative to a target object and determine that the capture device is in a certain position or orientation, possibly for a certain duration of time, associated with a user intention to capture the text from or about that target object. Further details and aspects regarding determining that a capture device is in the presence of text or a rendered document are described herein with respect to FIGS. 6A-6C.

In step 520, the system automatically changes the mode of operation of the capture device in response to the determination of step 510 that the device is in the presence of text to be captured by the device. In some cases, the system changes, alters, or modifies a current mode of operation of the capture device 300. For example, the capture device may currently be in a default mode (e.g., no applications or features running, displaying the home screen to a user), and, upon detecting the device is proximate to a rendered document to be captured, the system automatically changes the mode of operation to the document capture mode described herein. In some cases, the system does not change the mode of operation and instead executes software (e.g., launches an application or modifies current functionality of a running application) within a current mode of operation, wherein the executed software enables the capture device 300 to capture the proximate text. As one example, a web browser may be running on the capture device, and upon detecting the device is proximate to a rendered document, the system automatically points the browser to a web address for a search engine, anticipating the user will subsequently desire to search for text presented by the rendered document.

In step 530, the system captures text from the rendered document. As described herein, the system may perform an optical capture of the text (i.e., take an image of the text and possibly perform OCR or other techniques to identify text within the captured image), may perform an audio capture of the information (i.e., record the text being read aloud and recognize the text using speech recognition techniques), and so on.

In step 540, the system identifies the rendered document from the captured text. As described herein, in many cases the rendered document has an electronic counterpart, and the system is able to identify the electronic counterpart of a rendered document based on the captured text. The system may utilize the identity of the rendered document to decide what actions to perform, to provide context for various actions to perform, to track reader usage and develop models of the reading habits of users, and so on.

As discussed with respect to step 440, the system, in step 550, performs an action associated with the captured text and/or the identified rendered document. As described herein, the system may perform a number of actions associated with the captured text and/or the rendered document, including presenting content associated with the captured text and/or rendered document, identifying other documents associated with the captured text and/or rendered document, purchasing products associated with the captured text and/or rendered documents, and so on. In some cases, the system performs the action via display components 320 of the capture device 300. In some cases, the system performs the action via components remote from the capture device 300, such as an associated computing device, an associated mobile device, associated media presentation devices (e.g., stereos, mp3 players, televisions, displays, projectors), and so on.

Thus, in some examples, the system enables users of capture devices to easily and efficiently interact with rendered documents using multi-functional mobile devices (e.g., smartphones), among other benefits. That is, the system enables a capture device to capture the text a user reads, minimizing the delays associated with readying the capture device to capture the information.

Determining Information is Present or Proximate to a Capture Device

As described herein, the system may utilize a variety of techniques and components in order to determine that a capture device is in presence of information to be captured. In some cases, the system may utilize techniques that unequivocally determine information is present (such as determining text is within an image taken by an imaging component). In some cases, the system may utilize techniques that attempt to predict or anticipate a user's desire to initiate an information capture, without actually verifying information is present (such as predicting the user wishes to capture information when she holds her phone a certain way). In some cases, the system may utilize techniques that determine and record information is in the same environment as a user, even if the user does not interact with or notice the information.

In some examples, the system may utilize techniques that record the behavior of a user or the capture device to predict that information is present or has been consumed, without actually finding or detecting the information. The system may analyze data from some or all components within a capture device to make a prediction that information is present. As an example, the system may measure the altitude, location and acceleration of a capture device, and determine that the capture device is at a certain location going in a certain direction, and capture any information associated with that combination of factors to make the prediction.

Figure 6A:
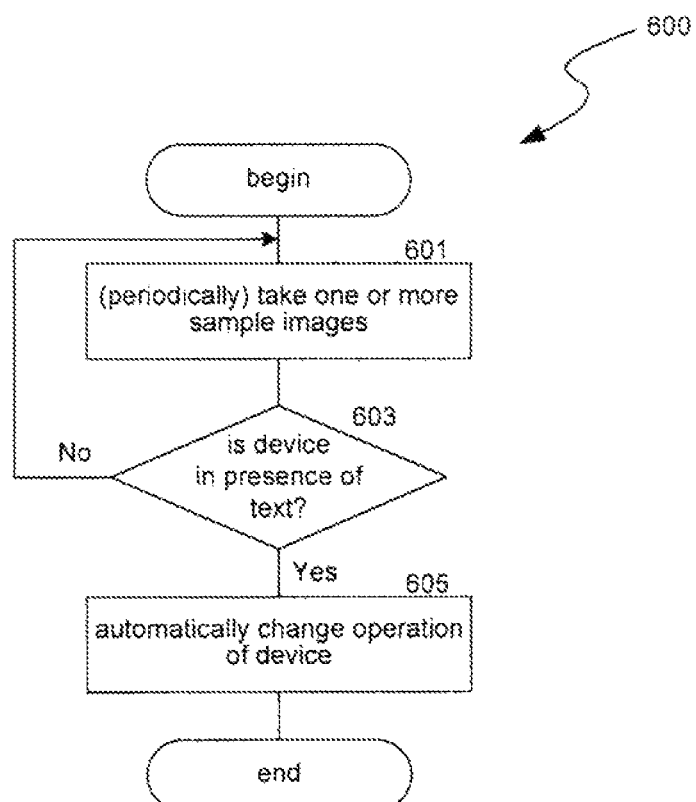
FIGS. 6A-6C are flow diagrams illustrating routines for determining a capture device is proximate to information to be captured.

In some examples, the system utilizes the optical or imaging components of a capture device in order to detect a capture device is proximate to information to be captured. Referring to FIG. 6A, a flow diagram illustrating a routine 600 for automatically changing operation of a capture device upon determining information is proximate to the device is shown.

In step 601, the system, using a detection component 330 such as an imaging component, takes one or more images of the environment surrounding the device. The system may sample images within the view of an imaging component, or may act in response to receiving a trigger that indicates the capture device is or may be within the proximity of information to be captured. That is, in response to a trigger the system may activate an imaging component out of a sleep or off state to sample or take images.

Examples of triggers received alone or in various combinations include:

Receiving information from components of a capture device used to detect proximity to information, including image, distance, proximity, and/or orientation information;

Detecting movement of the device that may indicate a capture device is proximate to information;

Detecting patterns of use of the device that may indicate a capture device is proximate to information;

Detecting certain light patterns within view of an imaging component;

Detecting certain features of target objects, including black to white transitions (indicating text), color transitions (indicating printed images), and so on;

Receiving vocal or tactile commands from a user;

Receiving commands from a user via a user interface of the capture device that indicate the user is attempting to capture information but has not been successful;

Being proximate to documents and other objects having attached RFID tags; and so on.

In step 603, the system determines whether the capture device is in the presence of text. In some cases, the system may make a determination based on one image. In some cases, the system may make the determination based on two or more images. In some cases, the system may poll a number or range of images taken by an imaging component, and when the number or range of images that include text satisfy a certain threshold number associated with a positive determination, make a determination that the sample images include text. For example, orientation, lighting, or other factors may impair the imaging components ability to take clear or accurate images of a target object, and the system may therefore take one of every ten images for two seconds in order to make the determination.

When the system determines the capture device is in the presence of text, routine 600 proceeds to step 605, and the system automatically changes operation of the capture device to a mode of operation associated with capturing information, else routine 600 proceeds back to step 601 or ends. In step 605, the system automatically changes the operation of the captured device, as described with respect to step 420 of FIG. 4 or step 520 of FIG. 5.

Figure 6B:
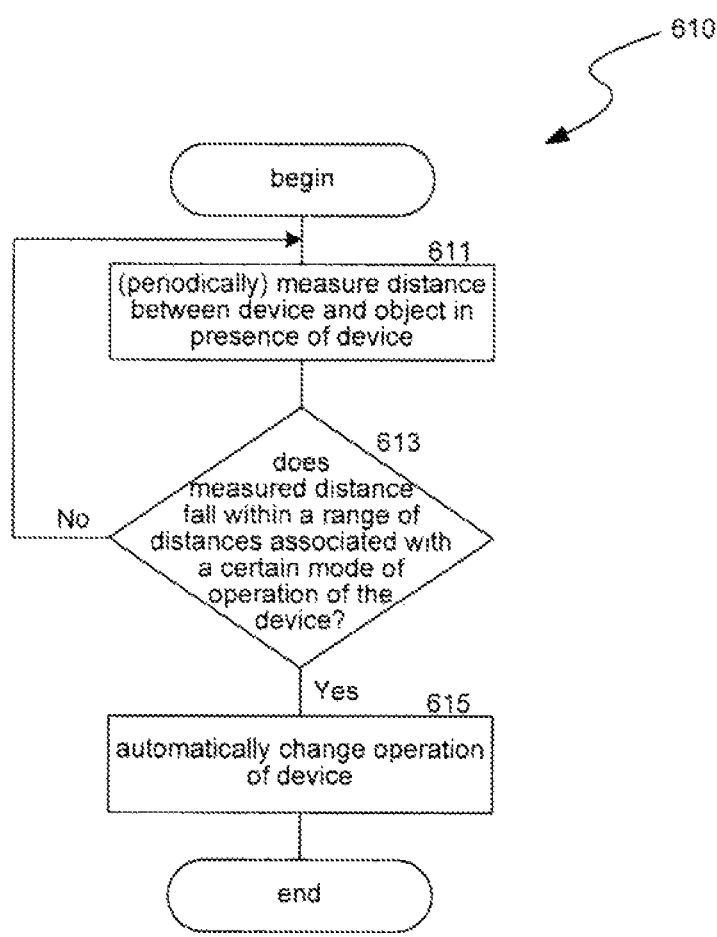

In some examples, the system utilizes distance and/or proximity components in order to detect a capture device is proximate to information to be captured. Referring to FIG. 6B, a flow diagram illustrating a routine 610 for automatically changing operation of a capture device upon determining information is proximate to the device is shown.

In step 611, the system, using a detection component 330 such as a distance measurement component, measures the distance between a capture device and an object in the presence of the device. The distance measurement component may measure the distance from a center point of the capture device to a target object, from an imaging component to the target object, and so on. In some cases, the distance measurement component is a proximity sensor, such as a sensor that emits an electromagnetic or electrostatic field or an infrared beam and looks for changes in a return signal from a target object. Example proximity sensors suitable for use with the system as a detection component 330 include inductive sensors, capacitive sensors, capacitive displacement sensors, eddy-current sensors, magnetic sensors, photocells, rangefinders, ultrasonic sensors, passive thermal infrared sensors, passive optical sensors (such as charge coupled devices), and so on. As described herein, in some cases the capture component 310 may also be utilized as the detection component 330 (e.g., an optical component of a mobile phone may capture text as well as act as a passive optical sensor).

The system may take one measurement, or may take a number of sample measurements in order to determine the distance. As described with respect to step 601, the system may also act and initiate distance measurements based on triggers that indicate the capture device may be within proximity to information to be captured.

In step 613, the system determines whether the measured distance falls within a range of distances associated with a certain mode of operation of the capture device, such as a mode of operation of the capture that facilitates the capture of text from rendered documents. In some cases, the system may make a determination based on one measurement. In some cases, the system may make the determination based on two or more measurements.

For example, the system may cause a rangefinder within a capture device to periodically take distance measurements upon receiving a trigger that the capture device is orientated in a generally horizontal position. The system may take ten measurements; with nine of the ten falling within a range of measurements associated with text capture operations. Thus, the system determines the measured distances satisfy the condition required to change operation of the capture device.

When the system determines the measured distances fall within a range of distances associated with a certain mode of operation of the capture device, routine 610 proceeds to step 615, and the system automatically changes operation of the capture device to a mode of operation associated with capturing information, else routine 610 proceeds back to step 611 or ends. In step 615, the system automatically changes the operation of the captured device, as described with respect to step 420 of FIG. 4 or step 520 of FIG. 5.

Figure 6C:
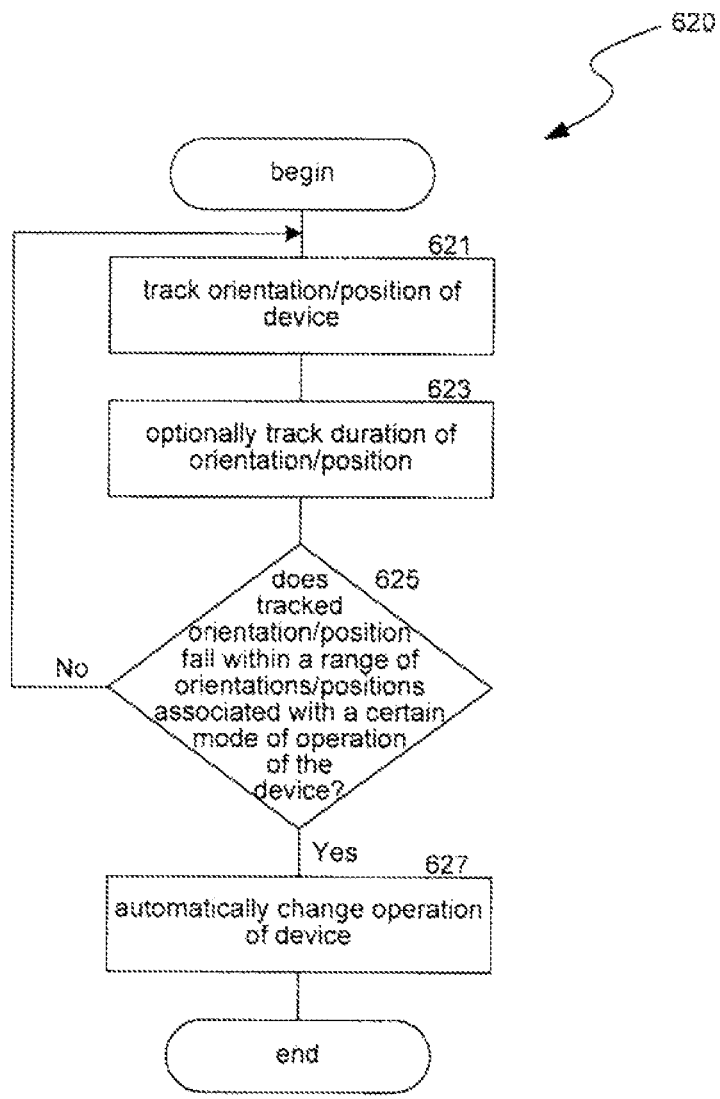

In some examples, the system utilizes orientation or position measurement or tracking components in order to detect that a capture device is proximate to information to be captured. Referring to FIG. 6C, a flow diagram illustrating a routine 620 for automatically changing operation of a capture device upon determining information is proximate to the device is shown.

In step 621, the system, using a detection component 330 such as an orientation or position tracking component, tracks the orientation or position of the capture device, optionally relative to an object in the presence of the device. The detection component may measure the orientation of the capture device with respect to the horizontal or vertical axes, the orientation of the capture device relative to a target object, and so on. The detection component may be a position sensor, such as an absolute or relative position sensor, or may be a linear or angular sensor. Example position sensors suitable for use with the system as detection components 330 include a compass, non-contact position sensors, potentiometers, linear variable differential transformers, capacitive transducers, eddy-current sensors, Hall effect sensors, grating sensors, rotary encoders, optical proximity sensors, piezo-electric transducers photo diode arrays and so on. As described herein, in some cases the capture component 310 may also be utilized as the detection component 330 (e.g., an optical component of a mobile phone may capture text as well as act as a photo diode array).

The system may take one measurement, or may take a number of sample measurements in order to determine the absolute or relative position. As described with respect to steps 601 or 611, the system may also act and initiate distance measurements based on triggers that indicate the capture device may be within proximity to information to be captured.

In step 623, the system optionally tracks whether the duration of the tracked position or orientation. For example, the system may start a clocking mechanism when the capture device is held in a position indicative of a desire to capture information.

In step 625, the system determines whether the position falls within a range of positions associated with a certain mode of operation of the capture device, such as a mode of operation of the capture that facilitates the capture of text from rendered documents. In some cases, the system may make a determination based on one measurement. In some cases, the system may make the determination based on two or more measurements. The system may determine whether a tracked position is within a certain position for a certain period of time, and make determinations based on the track position and the duration of the position.

For example, the system may cause a compass within a capture device to periodically measure the orientation of a capture device upon receiving a trigger that the capture device is orientated in a generally horizontal position. The system may track compass readings for three seconds; and if the compass readings indicate the capture device remained in a horizontal position, the system determines the compass readings satisfy the condition required to change operation of the capture device.

When the system determines the tracked orientation or position of the capture devices falls within a range of orientations/positions associated with a certain mode of operation of the capture device, routine 620 proceeds to step 625, and the system automatically changes operation of the capture device to a mode of operation associated with capturing information, else routine 620 proceeds back to step 621 or ends. In step 625, the system automatically changes the operation of the capture device, as described with respect to step 420 of FIG. 4 or step 520 of FIG. 5.

In some examples, the system may utilize some or all of the techniques described herein, either alone or in various combinations, to accurately determine when a capture device is proximate to information to be captured. For example, the system may periodically take distance measurements of target objects using a proximity sensor. When the proximity sensor measures distances that indicate a rendered document is within a capture device's proximity, the system may trigger an imaging component to take an image of a target object. When the image includes text, the system may confirm or verify the presence of a rendered document, and change the operation of the capture device.

In some examples of the system that utilize an optical or imaging component as both the capture component 310 and the detection component 330, a capture device periodically or continually buffers images in the field of view the imaging component, and uses some or all of the images to determine whether a rendered. document or other information is in view and within the capture device's proximity. As described herein, the system may detect information to be captured using elements also programmed to capture information, and determine information is proximate to the capture device. The system may make such determinations by analyzing one, some, or several factors within an image or images from the camera's field of view, including:

- the distance of a target object within an image (e.g., 18 inches or less may indicate proximity to the device);
- the shape of a target object and the distance from the target object to its surroundings (e.g., the target object is flat and close to a supporting surface);
- the angle between the camera and a target object (e.g., the camera is held roughly parallel to a plane defined by the target object);
- the orientation of the camera relative to a target object (e.g., the camera is in the same orientation, portrait or landscape, as the target object). This may depend on distance (e.g., when a capture device is very close to a rendered document, a landscape orientation may suggest proximity to a document);
- the lack of movement of the capture device or a target object with respect to a background;
- the presence of parallel and/or rectilinear elements and/or outlines, including rectilinear elements having a similar alignment with the camera's field of view;
- the presence of a target object having a known geometry (e.g., the object is shaped in traditional documents geometries such as in 8.5×11, 11×14, or A4 pages, is shaped like a postcard, is shaped like a book or magazine, and so on;
- the presence of text regions mixed with image regions on a target object; presence of regions of a target object that merely include a foreground color and a background color (e.g., very dark or black foreground pixels on very light or white background pixels);
- the distribution of foreground pixels vs. background pixels; and/or the presence of many sub-regions of relatively high contrast, such as contrasts found in full or partial images of glyphs, including alphanumeric characters, logo graphic characters, and so on. In some cases, these factors are defined or modified by a user, or by the system based on a user's information capture history or device operations history.

In some examples of the system, a capture device may invoke a low-power mode of operation when not in use, in order to preserve power of the device. During this mode of operation, the system may periodically monitor input from the device's detection component 330 to determine information is present. However, when the detection component 330 determines that information to be captured is proximate to the device, the system may cause the capture device to enter a higher power mode of operation and perform additional processing, before automatically changing the mode of operation to an information capture mode of operation. In some cases, the system may transition often from a lower power mode of monitoring an environment for information to a higher power mode of capturing information and back to a low power mode of monitoring information.

Optimizing the Determination of Proximity to Information

Users are often unique in the way they interact with and capture information, such as rendered documents. For example, people read text from documents at distances that are most comfortable for their eyesight. Different users of the system tend to interact with documents using a capture device at differing distances with respect to one another. Therefore, in some examples, the system may track and store information associated with captures of information, information associated with changing modes of operation of a capture device, and so on, in order to analyze and optimize how and when the system determines a capture device is proximate to information to be captured.

Figure 7:
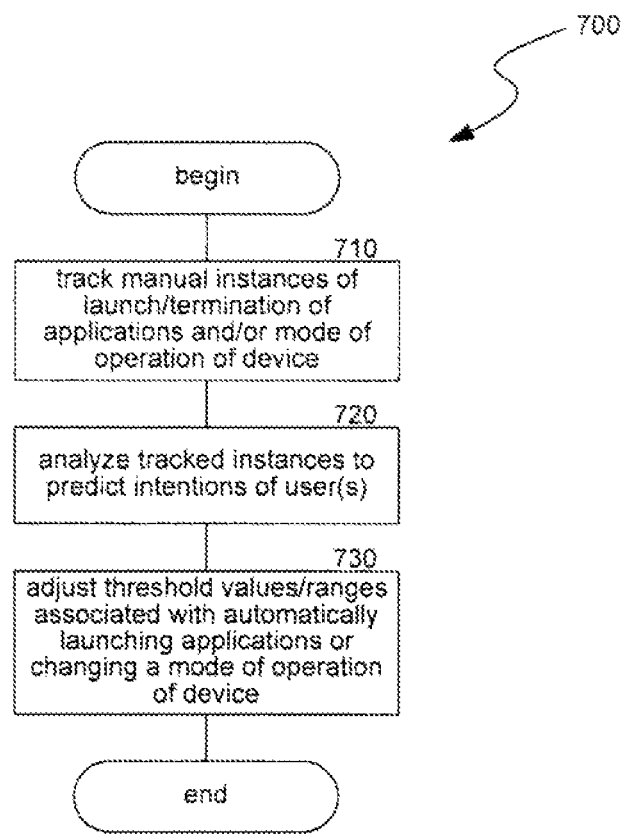
FIG. 7 is a flow diagram illustrating a routine for optimizing and/or adjusting a determination of proximity to information to be captured.

Referring to FIG. 7, a flow diagram illustrating a routine 700 for optimizing and/or adjusting a determination of proximity to information to be captured, based upon observing the user's actions in connection with captures and associated automatic actions. In step 710, the system tracks instances or occurrences of a launch or termination of an application or change of operation of a capture device. Examples instances or occurrences include:

- Instances where a user manually terminates an automatically launched application or an automatic change of operation;
- Instances where a user manually launches an application or manually changes mode of operation;
- Instances where a user attempts to trigger the determination component to cause an application to automatically launch or cause the capture device to change modes of operation;
- Instances where the system automatically captures information for a user that is later acted upon by the user;
- Instances where the system automatically captures information for a user that is never later acted upon by the user, and so on.

In some examples, the system stores and analyzes various data associated with the tracked instances, including data associated with a determination that a capture device is proximate to information to be captured. For example, the system stores and analyzes data associated with distances used during a determination of proximity between the capture device and a target object, data associated with contents of images used during a determination of proximity, data associated with the orientation/position of a capture device during a determination of proximity, data associated with user interactions before and/or after an application is launched or a operation of a capture device is changed. Table 1 reflects an example data structure that may store such data, although others are of course possible:

TABLE 1

| Distance | Duration | Action |
|----------|----------|--------|
| 10 cm | 1 sec | Manual termination |
| 9 cm | 3 sec | Used application |
| 12 cm | 3 sec | Manual termination |
| 8 cm | 3 sec | Used application |
| 7 cm | 2 sec | Manual termination |

In step 720, the system analyzes the tracked instances to predict intentions of users. For example, the system analyzes data associated with tracked instances, such as the data show in Table 1, or other data described herein. Using the data in Table 1, the system may conclude that a certain user wishes to capture information when his capture device is located between eight and nine cm from a rendered document, and is held for more than two seconds. Of course, other conclusions are possible. The system may then use this conclusion to adjust or modify a default rule associated with the capture device.

In step 730, the system adjusts and/or modifies rules and conditions associated with automatically launching applications or changing modes of operation of a capture device. Using the above example, the system adjusts or modifies a default rule of "when capture device is within a range of 5 cm to 12 cm for 1 sec or longer, change mode of operation" based on the above statistics. The adjusted rule may then be "when capture device is within a range of 8 cm to 9 cm for 2 sec or longer, change mode of operation."

In addition to optimizing the determination of proximity to information to be captured based on user responses to automatic launches and automatic changes of operation, the system may consider and analyze other data not related to the user. For example, the system may track and analyze data associated with the quality of light surrounding a capture device, the quality of images taken by an imaging component of the capture device, and so on.

Storing Captures of Information for a User

In some cases, the system captures information to be immediately acted upon by a user based on a user actively directing the automatic change of operations (i.e., the user hovers her capture device over a rendered document). In other cases, the system may capture information without a user's immediate knowledge, or without a user's specific direction (i.e., the system takes an image upon noticing text within the camera's view). Therefore, the system may perform many indirect and direct captures on behalf of a user. In order to enhance the user's experience, among other things, the system stores some or all the captures for the user in the user's Life Library, or a database or other list, such as a timeline of captures, which is accessible to the user.

Referring to FIGS. 8A-8B, representative displays of capture devices that depict a timeline or history of captures created by the system for a user are shown. In some examples, the system presents the timeline in a manner that enables the user to interact with entries of the timeline. For example, the display 800 includes a header 810 that includes information about the date and the user, one or more entries 811-815 associated with captures of information. Each of the entries may show the time of capture 820, an indicator 825 of whether or nor the system performed an action at the time of capture (in the Figure the icon indicates no action was yet performed), a description 830 of the capture, an icon or image 740 of the source of the capture, and/or other information (not shown). In some examples, the indicator 825 is an icon whose appearance conveys the nature of the action item. As an example, the indicator may represent a supplemental video is associated with the capture. The timeline may present information captured in a certain day, week, month, or any other defined period of time.

For example, entry 811 refers to a capture that occurred at 9:15 AM on February $18^{th}$. The capture is text in the rendered document named the "NYT", and the user performed an action at the time of capture (no indicator 725 in the entry). As another example, entry 814 refers to a capture that occurred at 10:03 AM on the same date. The capture was of an Audi advertisement on a bus, and the user did not perform an action at the time of capture (an indicator 725 of a star in the entry, informing the user that there is an action to be performed associated with the entry).

In some examples, the system modifies the presentation of the timeline. FIG. 8B presents the display 800 with a modified view of FIG. 8A, only presenting entries of captures from rendered documents. In addition to entries 811 and 812 shown in FIG. 8A, the display of FIG. 8B shows additional entries 816-818, associated with captures from rendered documents, such as a capture from an advertisement in the "NYT" 816, a capture from a book 817, and a capture of a receipt for a purchase of an item 818. The system may sort or group entries for presentation, depending on the needs and wants of the user, on the needs of the system, and so on. Thus, the system may create or build a timeline of captured information for a user, enabling a user to recall and interact with information they indirectly and directly captured (or that the system directly or indirectly captured) during a day or other period of time, among other benefits.

As discussed herein, in some cases, the system determines the capture device is proximate to information, changes mode of operation of the device, captures the information, and performs an action associated with the information, all with knowledge of and under direction by the user. However, there are other cases where the system determines the capture device is proximate to information, changes mode of operation of the capture device, and captures the information, without the user's knowledge or without control or direction by the user. In these cases, the system may process the captured information in order to avoid capturing and presenting too much unwanted information for a user.

For example, the system, without direction from or knowledge of the user, may capture information, performs a capture and before adding an entry to a user's timeline for the capture attempts to identify additional information or actions to perform that are associated with the capture. The system adds the entry when additional information or actions to perform are identified, and dismisses or discards the capture (or, transfers the entry to an alternative database) when no additional information or actions to be performed are identified. Thus, the system may edit or filter the timeline to provide a user with relevant information captured throughout the user's day, among other benefits.

The timeline, or database of captures, may include some or all information associated with the captures. The database may be searchable, may store associated content, and may be modified to meet the needs of a user.

Example Capture Devices

As described herein, the capture device 300 may be a mobile multi-function device such as a smartphone, a laptop with a camera, a digital camera, and/or other handheld multi-function devices. However, the capture device 300 may also be part of or integrated into objects commonly worn by a user, such as articles of clothing (glasses, clothing, hats, belts, and so on), accessories (watches, necklaces, earrings, and so on), and other devices or objects. In some cases, these devices may be well suited to meet certain needs of the system. These objects may include some or all of the components of capture device 300 shown in FIG. 3, or may include the capture component 310 and the communication component 360, and interact with the other components by communicating with an associated mobile device or computing device that includes the other components.

For example, a pair of glasses that includes a small imaging component (such as a camera integrated into the frame or one or both of the lenses) enables a user to easily capture large amounts of visual information without being burdensome, among other benefits. In some cases, the system may capture all information seen by the user, such as any text or discrete displays of information the user reads throughout the day (that is, the camera integrated into the glasses captures images of text when the user sees text, and hence determines the glasses (and the user) are in the presence of information to be captured). The system may track and store such information for immediate or later use by the user. In some cases, the system may capture the information in response to a trigger received by the user. For example, the user may say the word "capture," which is received by an associated mobile device that communicates the trigger to the glasses and causes the imaging component to capture information. Of course, other triggers are possible, such as physical triggers (e.g., the user taps the glasses or the associated mobile device, other audio triggers, triggers based on timing (e.g., the user looks at the text for a certain period of time, causing the camera to capture the text), and so on.

In some examples, the capture device may include components that process images captured by a person's eyes, instead of actively taking or capturing the images using components of or associated with the device. In these examples, the system may receive or reconstruct images seen by the user's eyes (the eyes acting as the capture component 310) by analyzing characteristics of a person's visual cerebral cortex, such as blood flow or other characteristics. For example, in late 2009, scientists at Japan's ATR Computational Neuroscience Laboratories, using functional magnetic resonance imaging (fMRI), were able to reconstruct images seen by people from associating brain activity with image patterns. Thus, in some examples, the capture component 310 is a component that deduces and renders images from brain activity to determine whether images seen by a user include text and/or other information.

Thus, in addition to mobile devices, other devices, objects and/or techniques may facilitate the capture of information for and by a user, often enabling the user and the system to easily record and document their daily interactions with interesting and compelling information.

CONCLUSION

The above detailed description of embodiments and examples of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. As an example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments and examples described above employ software stored tangible storage media within a mobile device or other computing system, applications and processes may be hard coded into the computing systems (e.g. stored in EEPROM, PROM, and so on).

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:
1. A mobile device comprising:
   one or more data processors that execute instructions that cause the one or more data processors to perform operations comprising:
      measuring a relative orientation between a document and the mobile device; and
      comparing the measured relative orientation to a threshold relative orientation associated with a document capture mode of the mobile device; and
   an action component that performs operations comprising:
      automatically transitioning the mobile device to the document capture mode when the measured relative orientation is within the threshold relative orientation associated with the document capture mode, wherein the threshold relative orientation is based on an analysis that includes:
         analyzing occurrences when a user of the mobile device rejected automatic launching of an application that performs actions in response to text captures; and analyzing occurrences when a user of the mobile device manually launched the application that performs actions in response to text captures.

2. The mobile device of claim 1, wherein the one or more data processors are programmed to determine that the mobile device is within a certain proximity to the document and capture an image of the document based on the determined proximity.

3. The mobile device of claim 2, wherein the one or more data processors are programmed to identify a rendered document based on text in the image and present an electronic counterpart of the rendered document at the mobile device.

4. The mobile device of claim 1, further comprising:
a display component that presents a view of a camera at the mobile device, wherein the action component is programmed to overlay text within the presented view of the camera with graphical elements that indicate the text is associated with additional information.

5. The mobile device of claim 1, further comprising:
a display component that presents a view of a camera at the mobile device, wherein the action component is programmed to present one or more user-selectable options associated with the text or a display of text with the presented view of the camera.

6. A non-transitory computer-readable medium whose contents, when executed by a mobile device, cause the mobile device to perform a method for performing an action associated with a rendered document, the method comprising:
measuring a relative orientation between a rendered document and the mobile device;
comparing the measured relative orientation to a threshold relative orientation associated with a document capture mode of the mobile device; and
automatically transitioning the mobile device to the document capture mode when the measured relative orientation is within the threshold relative orientation associated with the document capture mode, wherein the threshold relative orientation is determined by performing an analysis of previous occurrences of the mobile device in document capture mode, wherein the analysis includes:
analyzing occurrences when a user of the mobile device rejected automatic launching of an application that performs actions in response to text captures; and
analyzing occurrences when a user of the mobile device manually launched the application that performs actions in response to text captures.

7. The non-transitory computer-readable medium of claim 6, wherein measuring the relative orientation between the rendered document and the mobile device includes measuring a distance between an imaging component of the mobile device and the rendered document.

8. The non-transitory computer-readable medium of claim 6, wherein measuring the relative orientation between the rendered document and the mobile device includes measuring a distance between a center point of a display associated with the mobile device and the rendered document.

9. The non-transitory computer-readable medium of claim 6, wherein the threshold relative orientation is determined by a user of the mobile device.

10. A method comprising:
measuring a relative orientation between a rendered document and a mobile device;
comparing the measured relative orientation to a threshold relative orientation associated with a document capture mode of the mobile device; and
automatically transitioning the mobile device to the document capture mode when the measured relative orientation is within the threshold relative orientation associated with the document capture mode, wherein the threshold relative orientation is determined by performing an analysis of previous occurrences of the mobile device in document capture mode, wherein the threshold relative orientation is based on an analysis that includes:
analyzing occurrences when a user of the mobile device rejected automatic launching of an application that performs actions in response to text captures; and
analyzing occurrences when a user of the mobile device manually launched the application that performs actions in response to text captures.

11. The method of claim 10, wherein measuring the relative orientation between the rendered document and the mobile device includes measuring a distance between an imaging component of the mobile device and the rendered document.

12. The method of claim 10, wherein measuring the relative orientation between the rendered document and the mobile device includes measuring a distance between a center point of a display associated with the mobile device and the rendered document.

13. The method of claim 10, wherein the threshold relative orientation is determined by a user of the mobile device.

* * * * *